US012671628B2

(12) United States Patent
Feng et al.

(10) Patent No.: US 12,671,628 B2
(45) Date of Patent: Jun. 30, 2026

(54) CONFIGURATION MANAGEMENT METHOD AND APPARATUS, DEVICE, SYSTEM, STORAGE MEDIUM, AND PROGRAM PRODUCT

(71) Applicant: Huawei Technologies Co., Ltd., Shenzhen (CN)

(72) Inventors: Chong Feng, Shenzhen (CN); Qiufang Ma, Nanjing (CN); Bo Wu, Nanjing (CN); Qin Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 210 days.

(21) Appl. No.: 18/754,954

(22) Filed: Jun. 26, 2024

(65) Prior Publication Data

US 2024/0356806 A1 Oct. 24, 2024

Related U.S. Application Data

(63) Continuation of application No. PCT/CN2022/141551, filed on Dec. 23, 2022.

(30) Foreign Application Priority Data

Dec. 28, 2021 (CN) .......................... 202111629807.8

(51) Int. Cl.
*H04L 41/0859* (2022.01)
*G06F 11/1446* (2026.01)
*H04L 41/0853* (2022.01)

(52) U.S. Cl.
CPC ...... *H04L 41/0853* (2013.01); *G06F 11/1464* (2013.01); *H04L 41/0859* (2013.01); *G06F 2201/80* (2013.01)

(58) Field of Classification Search
CPC ............. H04L 41/0853; H04L 41/0859; H04L 41/0266; H04L 41/0836; H04L 41/0856;
(Continued)

(56) References Cited

U.S. PATENT DOCUMENTS 8,335,171 B1 * 12/2012 Purkayastha ....... H04L 41/0863
370/254
10,200,248 B1 * 2/2019 Jiang ................... H04L 41/0879
(Continued)

FOREIGN PATENT DOCUMENTS

CN 102427409 A 4/2012
CN 110351107 A 10/2019
(Continued)

OTHER PUBLICATIONS

R. Enns, Ed. et al, "Network Configuration Protocol (NETCONF)," RFC 6241, Jun. 2011, 113 pages.
(Continued)

*Primary Examiner* — Karen C Tang
(74) *Attorney, Agent, or Firm* — Conley Rose, P.C.

(57) ABSTRACT

In a configuration management process, a configuration commission request sent by a client to a server includes an identifier of a specified data source. The server, even if configuration data in a candidate configuration datastore comes from a plurality of data sources, does not commit all configuration data that comes from data sources other than the specified data source in the plurality of data sources to a running configuration datastore. That is, some configuration data that is not expected to be committed is not forced to be committed when configuration data from a data source needs to be committed.

17 Claims, 3 Drawing Sheets

(58) Field of Classification Search
CPC ............. H04L 41/0863; H04L 67/1095; H04L
67/141; H04L 67/34; H04L 41/0213;
H04L 41/082; H04L 41/0823; H04L
41/0846; G06F 11/1464; G06F 2201/80
USPC ......................................................... 709/224
See application file for complete search history.

(56) References Cited

U.S. PATENT DOCUMENTS

| | | | | |
|---|---|---|---|---|
| 10,567,223 | B1 * | 2/2020 | Sidaraddi | ............ H04L 41/0859 |
| 11,451,440 | B1 * | 9/2022 | Deshmukh | .......... H04L 41/0816 |
| 2016/0350095 | A1 | 12/2016 | Ramachandran et al. | |
| 2017/0171102 | A1 * | 6/2017 | Parker | ..................... H04L 67/02 |
| 2017/0331669 | A1 * | 11/2017 | Ganesh | .............. H04L 41/0226 |
| 2018/0069752 | A1 * | 3/2018 | Igarashi | .............. H04L 41/0853 |
| 2019/0245740 | A1 * | 8/2019 | Kachhla | ................ H04L 41/045 |
| 2020/0259712 | A1 * | 8/2020 | Jonnalagadda | ..... H04L 41/0843 |
| 2021/0075877 | A1 * | 3/2021 | Miedema | ................ H04L 67/51 |
| 2021/0120104 | A1 * | 4/2021 | Al-Mufti | ............. H04L 41/0806 |
| 2021/0297508 | A1 * | 9/2021 | Sambandan | .......... H04L 67/133 |
| 2022/0294692 | A1 * | 9/2022 | Miedema | ........... H04L 41/0816 |
| 2022/0321566 | A1 * | 10/2022 | Coyle | ................... H04L 63/101 |
| 2022/0337479 | A1 * | 10/2022 | Zheng | ................ H04L 41/0806 |
| 2022/0400412 | A1 * | 12/2022 | Grayson | .............. H04W 28/16 |
| 2024/0388967 | A1 * | 11/2024 | Grayson | ............ H04L 41/0806 |

FOREIGN PATENT DOCUMENTS

| | | |
|---|---|---|
| CN | 110768818 A | 2/2020 |
| CN | 113438095 A | 9/2021 |
| EP | 3823213 A1 | 5/2021 |

OTHER PUBLICATIONS

M. Bjorklund et al, "NETCONF Extensions to Support the Network Management Datastore Architecture," RFC 8526, Mar. 2019, 23 pages.

A. Bierman, "RESTCONF Protocol," RFC 8040, Jan. 2017, 137 pages.

Bierman Yumaworks A et al: "NETCONF Efficiency Extensions," draft-bierman-netconf-efficiency-extensions-02.txt, Network Working Group, Oct. 21, 2014, 65 pages.

* cited by examiner

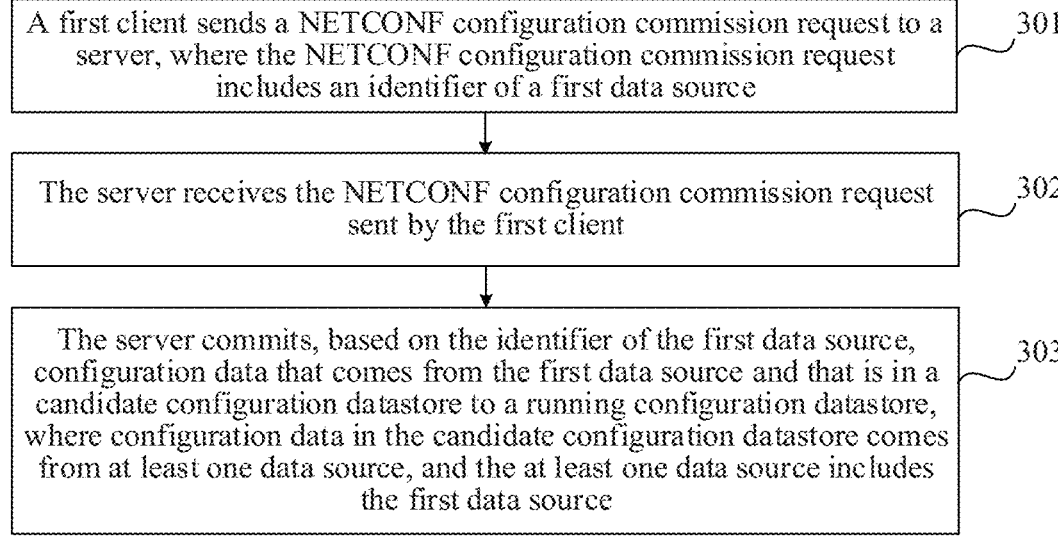

A first client sends a NETCONF configuration commission request to a server, where the NETCONF configuration commission request includes an identifier of a first data source ⟍301

The server receives the NETCONF configuration commission request sent by the first client ⟍302

The server commits, based on the identifier of the first data source, configuration data that comes from the first data source and that is in a candidate configuration datastore to a running configuration datastore, where configuration data in the candidate configuration datastore comes from at least one data source, and the at least one data source includes the first data source ⟍303

FIG. 3

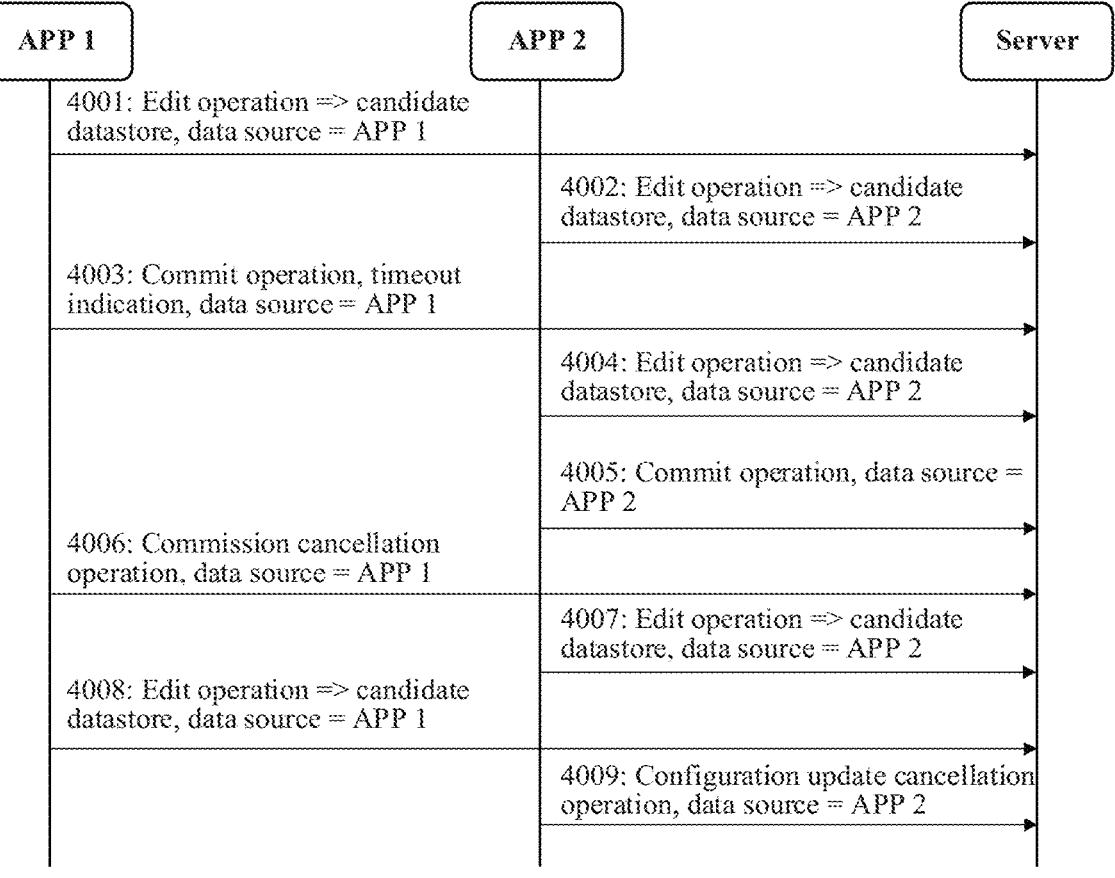

| APP 1 | APP 2 | Server |
|---|---|---|
| 4001: Edit operation => candidate datastore, data source = APP 1 | | |
| | 4002: Edit operation => candidate datastore, data source = APP 2 | |
| 4003: Commit operation, timeout indication, data source = APP 1 | | |
| | 4004: Edit operation => candidate datastore, data source = APP 2 | |
| | 4005: Commit operation, data source = APP 2 | |
| 4006: Commission cancellation operation, data source = APP 1 | | |
| | 4007: Edit operation => candidate datastore, data source = APP 2 | |
| 4008: Edit operation => candidate datastore, data source = APP 1 | | |
| | 4009: Configuration update cancellation operation, data source = APP 2 | |

CONFIGURATION MANAGEMENT METHOD AND APPARATUS, DEVICE, SYSTEM, STORAGE MEDIUM, AND PROGRAM PRODUCT

CROSS-REFERENCE TO RELATED APPLICATIONS

This is a continuation of International Patent Application No. PCT/CN2022/141551 filed on Dec. 23, 2022, which claims priority to Chinese Patent Application No. 202111629807.8 filed on Dec. 28, 2021. The disclosures of the aforementioned applications are hereby incorporated by reference in their entireties.

TECHNICAL FIELD

The present disclosure relates to the field of communication technologies, and in particular, to a configuration management method and apparatus, a device, a system, a storage medium, and a program product.

BACKGROUND

A Network Configuration Protocol (NETCONF) is a mechanism for managing a server (for example, a network device). Administrators and tenants can use this mechanism to perform configuration management on servers via clients. The configuration management includes configuration edit, configuration commit, and the like.

In related technologies, NETCONF defines configuration delivery (edit-config) and commit operations. An administrator is used as an example. After a session is established between a client and a server, the administrator edits to-be-delivered target configuration data on the client in a configuration update process. After the editing is completed, the client sends a configuration update request to the server using the edit-config operation, to update the target configuration data to a candidate configuration datastore. Then, the client sends a configuration commission request to the server using the commit operation, to commit to-be-committed configuration data in the candidate configuration datastore to a running configuration datastore.

However, the to-be-committed configuration data in the candidate configuration datastore may come from different administrators, clients, tenants, applications, and the like. That is, configuration data in the candidate configuration datastore comes from a plurality of data sources. After receiving any configuration commission request, the server commits, to the running configuration datastore, all of the to-be-committed configuration data that is in the candidate configuration datastore and that comes from the plurality of data sources. As a result, some configuration data that is not expected to be committed is forced to be committed.

SUMMARY

Embodiments of the present disclosure provide a configuration management method and apparatus, a device, a system, a storage medium, and a program product. A server performs, based on an identifier of a data source specified by a client, configuration management on configuration data corresponding to the foregoing data sources. This can reduce mutual impact of configuration management between different data sources, and improve configuration management flexibility and reliability. The technical solutions are as follows:

According to a first aspect, a configuration management method is provided. The method is applied to a server, and the method includes:

The server receives a NETCONF configuration commission request sent by a first client, where the NETCONF configuration commission request includes an identifier of a first data source; and commits, based on the identifier of the first data source, configuration data that comes from the first data source and that is in a candidate configuration datastore to a running configuration datastore, where configuration data in the candidate configuration datastore comes from at least one data source, and the at least one data source includes the first data source.

That is, when a configuration is committed, a client specifies to commit configuration data of a specific data source. In this way, the server performs, based on an identifier of the data source specified by the client, configuration management on the configuration data corresponding to the data source, so that some configuration data that is not expected to be committed is not forced to be committed, thereby reducing mutual impact of configuration management between different data sources, and improving configuration management flexibility and reliability.

Optionally, the method further includes: The server receives a NETCONF configuration update request sent by the first client, where the NETCONF configuration update request includes an identifier of a second data source and first configuration data; and updates the first configuration data to a first target configuration datastore based on the identifier of the second data source, and records a correspondence between the first data source and the first configuration data in the first target configuration datastore. In other words, when a configuration is updated, a client specifies to update configuration data of a specific data source. In this way, the server can record a correspondence between the configuration data and the data source. This helps the server subsequently perform configuration update cancellation, configuration commission, commission cancellation, configuration backup, configuration copying, configuration rollback, configuration query, and the like based on the specified data source. In short, the client attaches a data source identifier to the configuration data, to implement refined configuration management based on the data source.

Optionally, the method further includes: The server receives a NETCONF configuration update cancellation request sent by the first client, where the NETCONF configuration update cancellation request includes an identifier of a third data source; and rolls back, based on the identifier of the third data source, configuration data that comes from the third data source and that is in the candidate configuration datastore to be consistent with configuration data that comes from the third data source and that is in the running configuration datastore. In other words, this solution supports configuration update cancellation for a specified data source, thereby reducing mutual impact of configuration management between different data sources.

Optionally, the method further includes: The server receives a NETCONF commission cancellation request sent by the first client, where the NETCONF commission cancellation request includes an identifier of a fourth data source; and cancels, based on the identifier of the fourth data source, a commit operation on configuration data that comes from the fourth data source and that is in the running configuration datastore. In other words, this solution supports a commission cancellation operation for a specified data source, thereby reducing mutual impact of configuration management between different data sources.

Optionally, the method further includes: The server receives a NETCONF configuration copying request sent by the first client, where the NETCONF configuration copying request includes an identifier of a first source configuration datastore, an identifier of a fifth data source, and an identifier of a first target storage object; and copies, based on the identifier of the first source configuration datastore, the identifier of the fifth data source, and the identifier of the first target storage object, configuration data that comes from the fifth data source and that is in the first source configuration datastore to the first target storage object. In other words, this solution supports configuration copying for a specified data source, which facilitates subsequent configuration restoration for the specified data source based on copied configuration data.

Optionally, the first target storage object includes a second target configuration datastore or a first target file.

Optionally, the method further includes: The server receives a NETCONF backup creation request sent by the first client, where the NETCONF backup creation request includes an identifier of a sixth data source; and backs up, based on the identifier of the sixth data source, configuration data that comes from the sixth data source and that is in a second source configuration datastore, to generate one piece of backup configuration data. In other words, this solution supports configuration backup for a specified data source, which facilitates subsequent configuration rollback for the specified data source based on configuration data that is backed up.

Optionally, the server stores one or more pieces of backup configuration data, and the method further includes: The server receives a NETCONF configuration rollback request sent by the first client, where the NETCONF configuration rollback request includes an identifier of first backup configuration data and an identifier of a seventh data source, and the first backup configuration data is one of the one or more pieces of backup configuration data; and rolls back, based on the identifier of the first backup configuration data and the identifier of the seventh data source, configuration data that comes from the seventh data source and that is in a third target configuration datastore to be consistent with the first backup configuration data. In other words, this solution supports configuration rollback on configuration data of a specified data source, thereby reducing impact on a configuration of another data source.

Optionally, the method further includes: The server receives a NETCONF configuration query request sent by the first client, where the NETCONF configuration query request includes an identifier of an eighth data source; queries, based on the identifier of the eighth data source, a third source configuration datastore for configuration data that comes from the eighth data source, to obtain a query result; and sends a configuration query response to the first client, where the configuration query response includes the query result. In other words, this solution supports configuration query for a specified data source.

Optionally, the first data source includes one or more of the following: a first tenant, a first service, a first session, the first client, and a first administrator, where the first tenant is any tenant leasing the server, the first service is any service on the first client, the first session is a session established between the first client and the server, the first client is any client that performs configuration management on the server, and the first administrator is any user using the first client. In short, data sources in this solution include a tenant, a service, an application, a session, a client, and an administrator (also referred to as a user). The data sources are differentiated to implement refined configuration management. For example, if configuration data is data configured by a first administrator of a first tenant, a data source to which the configuration data belongs includes the first tenant and the first administrator.

According to a second aspect, a configuration management method is provided. The method is applied to a first client, and the method includes:

The first client sends a NETCONF configuration commission request to a server, where the NETCONF configuration commission request includes an identifier of a first data source; and the NETCONF configuration commission request indicates the server to commit, based on the identifier of the first data source, configuration data that comes from the first data source and that is in a candidate configuration datastore to a running configuration datastore, where configuration data in the candidate configuration datastore comes from at least one data source, and the at least one data source includes the first data source.

That is, when a configuration is committed, a client specifies to commit configuration data of a specific data source. In this way, some configuration data that is not expected to be committed is not forced to be committed, thereby reducing mutual impact of configuration management between different data sources.

Optionally, the method further includes: The first client sends a NETCONF configuration update request to the server, where the NETCONF configuration update request includes an identifier of a second data source and first configuration data; and the NETCONF configuration update request indicates the server to update the first configuration data to a first target configuration datastore based on the identifier of the second data source, and record a correspondence between the first data source and the first configuration data in the first target configuration datastore. In other words, when a configuration is updated, a client specifies to update configuration data of a specific data source. In this way, the server can record a correspondence between the configuration data and the data source. This helps the server subsequently perform configuration update cancellation, configuration commission, commission cancellation, configuration backup, configuration copying, configuration rollback, configuration query, and the like based on the specified data source. In short, the client attaches a data source identifier to the configuration data, to implement refined configuration management based on the data source.

Optionally, the method further includes: The first client sends a NETCONF configuration update cancellation request to the server, where the NETCONF configuration update cancellation request includes an identifier of a third data source; and the NETCONF configuration update cancellation request indicates the server to roll back, based on the identifier of the third data source, configuration data that comes from the third data source and that is in the candidate configuration datastore to be consistent with configuration data that comes from the third data source and that is in the running configuration datastore.

Optionally, the method further includes: The first client sends a NETCONF commission cancellation request to the server, where the NETCONF commission cancellation request includes an identifier of a fourth data source; and the NETCONF commission cancellation request indicates the server to cancel, based on the identifier of the fourth data source, a commit operation on configuration data that comes from the fourth data source and that is in the running configuration datastore.

Optionally, the method further includes: The first client sends a NETCONF configuration copying request to the server, where the NETCONF configuration copying request includes an identifier of a first source configuration datastore, an identifier of a fifth data source, and an identifier of a first target storage object; and the NETCONF configuration copying request indicates the server to copy, based on the identifier of the first source configuration datastore, the identifier of the fifth data source, and the identifier of the first target storage object, configuration data that comes from the fifth data source and that is in the first source configuration datastore to the first target storage object.

Optionally, the first target storage object includes a second target configuration datastore or a first target file.

Optionally, the method further includes: The first client sends a NETCONF backup creation request to the server, where the NETCONF backup creation request includes an identifier of a sixth data source; and the NETCONF backup creation request indicates the server to back up, based on the identifier of the sixth data source, configuration data that comes from the sixth data source and that is in a second source configuration datastore, to generate one piece of backup configuration data.

Optionally, the server stores one or more pieces of backup configuration data. The method further includes: The first client sends a NETCONF configuration rollback request to the server, where the NETCONF configuration rollback request includes an identifier of first backup configuration data and an identifier of a seventh data source, and the first backup configuration data is one of the one or more pieces of backup configuration data; and the NETCONF configuration rollback request indicates the server to roll back, based on the identifier of the first backup configuration data and the identifier of the seventh data source, configuration data that comes from the seventh data source and that is in a third target configuration datastore to be consistent with the first backup configuration data.

Optionally, the method further includes: The first client sends a NETCONF configuration query request to the server, where the NETCONF configuration query request includes an identifier of an eighth data source; and receives a configuration query response sent by the server, where the configuration query response includes a query result, and the query result is obtained by the server by querying, based on the identifier of the eighth data source, a third source configuration datastore for configuration data that comes from the eighth data source.

Optionally, the first data source includes one or more of the following: a first tenant, a first service, a first session, the first client, and a first administrator, where the first tenant is any tenant leasing the server, the first service is any service on the first client, the first session is a session established between the first client and the server, the first client is any client that performs configuration management on the server, and the first administrator is any user using the first client.

According to a third aspect, a configuration management apparatus is provided. The configuration management apparatus has a function of implementing behavior of the configuration management method in the first aspect. The configuration management apparatus includes one or more modules, and the one or more modules are configured to implement the configuration management method provided in the first aspect.

In other words, a configuration management apparatus is provided, where the apparatus is used in a server, and the apparatus includes: a first receiving module configured to receive a NETCONF configuration commission request sent by a first client, where the NETCONF configuration commission request includes an identifier of a first data source; and a configuration commission module configured to commit, based on the identifier of the first data source, configuration data that comes from the first data source and that is in a candidate configuration datastore to a running configuration datastore, where configuration data in the candidate configuration datastore comes from at least one data source, and the at least one data source includes the first data source.

Optionally, the apparatus further includes: a second receiving module configured to receive a NETCONF configuration update request sent by the first client, where the NETCONF configuration update request includes an identifier of a second data source and first configuration data; and a configuration update module configured to: update the first configuration data to a first target configuration datastore based on the identifier of the second data source, and record a correspondence between the first data source and the first configuration data in the first target configuration datastore.

Optionally, the apparatus further includes: a third receiving module configured to receive a NETCONF configuration update cancellation request sent by the first client, where the NETCONF configuration update cancellation request includes an identifier of a third data source; and an update cancellation module configured to roll back, based on the identifier of the third data source, configuration data that comes from the third data source and that is in the candidate configuration datastore to be consistent with configuration data that comes from the third data source and that is in the running configuration datastore.

Optionally, the apparatus further includes: a fourth receiving module configured to receive a NETCONF commission cancellation request sent by the first client, where the NETCONF commission cancellation request includes an identifier of a fourth data source; and a commission cancellation module configured to cancel, based on the identifier of the fourth data source, a commit operation on configuration data that comes from the fourth data source and that is in the running configuration datastore.

Optionally, the apparatus further includes: a fifth receiving module configured to receive a NETCONF configuration copying request sent by the first client, where the NETCONF configuration copying request includes an identifier of a first source configuration datastore, an identifier of a fifth data source, and an identifier of a first target storage object; and a configuration copying module configured to copy, based on the identifier of the first source configuration datastore, the identifier of the fifth data source, and the identifier of the first target storage object, configuration data that comes from the fifth data source and that is in the first source configuration datastore to the first target storage object.

Optionally, the first target storage object includes a second target configuration datastore or a first target file.

Optionally, the apparatus further includes: a sixth receiving module configured to receive a NETCONF backup creation request sent by the first client, where the NETCONF backup creation request includes an identifier of a sixth data source; and a configuration backup module configured to back up, based on the identifier of the sixth data source, configuration data that comes from the sixth data source and that is in a second source configuration datastore, to generate one piece of backup configuration data.

Optionally, the server stores one or more pieces of backup configuration data, and the apparatus further includes: a seventh receiving module configured to receive a NET- CONF configuration rollback request sent by the first client, where the NETCONF configuration rollback request includes an identifier of first backup configuration data and an identifier of a seventh data source, and the first backup configuration data is one of the one or more pieces of backup configuration data; and a configuration rollback module configured to roll back, based on the identifier of the first backup configuration data and the identifier of the seventh data source, configuration data that comes from the seventh data source and that is in a third target configuration datastore to be consistent with the first backup configuration data.

Optionally, the apparatus further includes: an eighth receiving module configured to receive a NETCONF configuration query request sent by the first client, where the NETCONF configuration query request includes an identifier of an eighth data source; a configuration query module configured to query, based on the identifier of the eighth data source, a third source configuration datastore for configuration data that comes from the eighth data source, to obtain a query result; and a query response module configured to send a configuration query response to the first client, where the configuration query response includes the query result.

Optionally, the first data source includes one or more of the following: a first tenant, a first service, a first session, the first client, and a first administrator.

The first tenant is any tenant leasing the server, the first service is any service on the first client, the first session is a session established between the first client and the server, the first client is any client that performs configuration management on the server, and the first administrator is any user using the first client.

According to a fourth aspect, a configuration management apparatus is provided. The configuration management apparatus has a function of implementing behavior of the configuration management method in the second aspect. The configuration management apparatus includes one or more modules, and the one or more modules are configured to implement the configuration management method provided in the second aspect.

In other words, a configuration management apparatus is provided, where the apparatus is used in a first client, and the apparatus includes: a first sending module configured to send a NETCONF configuration commission request to a server, where the NETCONF configuration commission request includes an identifier of a first data source; and the NETCONF configuration commission request indicates the server to commit, based on the identifier of the first data source, configuration data that comes from the first data source and that is in a candidate configuration datastore to a running configuration datastore, where configuration data in the candidate configuration datastore comes from at least one data source, and the at least one data source includes the first data source.

Optionally, the apparatus further includes: a second sending module configured to send a NETCONF configuration update request to the server, where the NETCONF configuration update request includes an identifier of a second data source and first configuration data; and the NETCONF configuration update request indicates the server to update the first configuration data to a first target configuration datastore based on the identifier of the second data source, and record a correspondence between the first data source and the first configuration data in the first target configuration datastore.

Optionally, the apparatus further includes: a third sending module configured to send a NETCONF configuration update cancellation request to the server, where the NETCONF configuration update cancellation request includes an identifier of a third data source; and the NETCONF configuration update cancellation request indicates the server to roll back, based on the identifier of the third data source, configuration data that comes from the third data source and that is in the candidate configuration datastore to be consistent with configuration data that comes from the third data source and that is in the running configuration datastore.

Optionally, the apparatus further includes: a fourth sending module configured to send a NETCONF commission cancellation request to the server, where the NETCONF commission cancellation request includes an identifier of a fourth data source; and the NETCONF commission cancellation request indicates the server to cancel, based on the identifier of the fourth data source, a commit operation on configuration data that comes from the fourth data source and that is in the running configuration datastore.

Optionally, the apparatus further includes: a fifth sending module configured to send a NETCONF configuration copying request to the server, where the NETCONF configuration copying request includes an identifier of a first source configuration datastore, an identifier of a fifth data source, and an identifier of a first target storage object; and the NETCONF configuration copying request indicates the server to copy, based on the identifier of the first source configuration datastore, the identifier of the fifth data source, and the identifier of the first target storage object, configuration data that comes from the fifth data source and that is in the first source configuration datastore to the first target storage object.

Optionally, the first target storage object includes a second target configuration datastore or a first target file.

Optionally, the apparatus further includes: a sixth sending module configured to send a NETCONF backup creation request to the server, where the NETCONF backup creation request includes an identifier of a sixth data source; and the NETCONF backup creation request indicates the server to back up, based on the identifier of the sixth data source, configuration data that comes from the sixth data source and that is in a second source configuration datastore, to generate one piece of backup configuration data.

Optionally, the server stores one or more pieces of backup configuration data, and the apparatus further includes: a seventh sending module configured to send a NETCONF configuration rollback request to the server, where the NETCONF configuration rollback request includes an identifier of first backup configuration data and an identifier of a seventh data source, and the first backup configuration data is one of the one or more pieces of backup configuration data; and the NETCONF configuration rollback request indicates the server to roll back, based on the identifier of the first backup configuration data and the identifier of the seventh data source, configuration data that comes from the seventh data source and that is in a third target configuration datastore to be consistent with the first backup configuration data.

Optionally, the apparatus further includes: an eighth sending module configured to send a NETCONF configuration query request to the server, where the NETCONF configuration query request includes an identifier of an eighth data source; and a receiving module configured to receive a configuration query response sent by the server, where the configuration query response includes a query result, and the query result is obtained by the server by querying, based on the identifier of the eighth data source, a third source configuration datastore for configuration data that comes from the eighth data source.

Optionally, the first data source includes one or more of the following: a first tenant, a first service, a first session, the first client, and a first administrator.

The first tenant is any tenant leasing the server, the first service is any service on the first client, the first session is a session established between the first client and the server, the first client is any client that performs configuration management on the server, and the first administrator is any user using the first client.

According to a fifth aspect, a communication device is provided. The communication device includes a processor and a memory, and the memory is configured to store a program for performing the configuration management method provided in the first aspect or the second aspect, and store data for implementing the configuration management method provided in the first aspect or the second aspect. The processor is configured to execute the program stored in the memory. An operation apparatus of the communication device may further include a communication bus, and the communication bus is configured to establish a connection between the processor and the memory.

According to a sixth aspect, a configuration management system is provided, where the configuration management system includes a server and a first client, and the first client is any client that performs configuration management on the server. The server is configured to implement steps of the configuration management method provided in the first aspect, and the first client is configured to implement steps of the configuration management method provided in the second aspect.

According to a seventh aspect, a computer-readable storage medium is provided, where the computer-readable storage medium stores instructions. When the instructions are run on a computer, the computer is enabled to perform the configuration management method according to the first aspect or the second aspect.

According to an eighth aspect, a computer program product including instructions is provided. When the computer program product runs on a computer, the computer is enabled to perform the configuration management method according to the first aspect or the second aspect.

Technical effects achieved in the third aspect, the fourth aspect, the fifth aspect, the sixth aspect, the seventh aspect, and the eighth aspect are similar to technical effects achieved by using corresponding technical means in the first aspect or the second aspect, and details are not described herein again.

A technical solution provided in the present disclosure includes at least the following beneficial effects:

In a configuration management process, a configuration commission request sent by a client to a server includes an identifier of a specified data source, and the server performs, based on the identifier of the data source specified by the client, configuration management on configuration data corresponding to the data source. In this way, even if configuration data in a candidate configuration datastore comes from a plurality of data sources, the server does not commit all configuration data that comes from data sources other than the specified data source in the plurality of data sources to a running configuration datastore. In other words, in this solution, some configuration data that is not expected to be committed is not forced to be committed when configuration data from a data source needs to be committed. It can be learned that, in this solution, configuration management is performed by specifying a data source, thereby reducing mutual impact of configuration management between different data sources. This solution is more flexible and reliable.

BRIEF DESCRIPTION OF DRAWINGS

FIG. 3 is a flowchart of a configuration management method according to an embodiment of the present disclosure;

FIG. 4 is a flowchart of another configuration management method according to an embodiment of the present disclosure;

DESCRIPTION OF EMBODIMENTS

Figure 1:
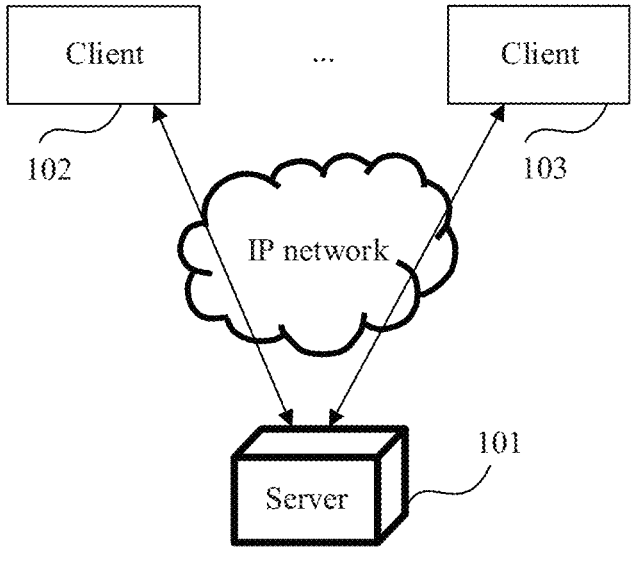
FIG. 1 is an architectural diagram of a system related to a configuration management method according to an embodiment of the present disclosure.

To make the objectives, technical solutions, and advantages of the present disclosure clearer, the following further describes the implementations of the present disclosure in detail with reference to the accompanying drawings.

For ease of understanding, some nouns and terms in embodiments of the present disclosure are first explained.

A NETCONF is a mechanism for managing network devices. Administrators can use this mechanism to perform configuration management on the network devices via clients. NETCONF is a network configuration and management protocol that is based on an extensible markup language (XML) and in which modeling is performed through Yet Another Next Generation (YANG), and implements communication between a client and a network device based on a remote procedure call (RPC) mechanism. The NETCONF is defined in request for comments (RFC) 6241 and RFC 8526.

A Representational State Transfer Configuration Protocol (RESTCONF) is a stateless protocol based on a Hypertext Transfer Protocol (HTTP) defined in RFC 8040. It uses HTTP to perform configuration management, provides YANG-based modeling for a configuration datastore, and supports operations such as adding, deleting, modifying, and querying configuration data.

Client/Server (C/S) architecture: Both NETCONF and RESTCONF use the C/S architecture. A network management device or a controller functions as a client, and a network device (such as a router, a switch, and a bridge) functions as a server. In embodiments of the present disclosure, the client communicates with the server based on NETCONF or RESTCONF. In the following embodiments, an example in which a client and a server communicate based on NETCONF is used for description.

A network management datastore architecture (NMDA) is a network multi-datastore architecture defined in RFC 8342, and defines a running configuration datastore, a candidate configuration datastore, a startup configuration datastore, an intended configuration datastore, and an operational configuration datastore. The NMDA also supports extension of other datastores.

Datastore: The NETCONF protocol and the RESTCONF protocol allow definition of a plurality of configuration datastores (also referred to as datastores, databases, and configuration databases), to store configuration data, status information, and the like of a network device. For example, the running configuration datastore is for storing configuration data that takes effect in a running process of the network device. The candidate configuration datastore is for storing configuration data that is configured for the network device but does not take effect, that is, storing configuration data edited by a storage administrator that has not been committed for formal validation. After the candidate configuration datastore is committed to the running configuration datastore, the configuration data takes effect. The startup configuration datastore is for storing configuration data to be used during next startup of the network device. The operational configuration datastore is read-only for a client, and stores all data of a current service that takes effect when the network device is running, including user configuration data, system configuration data, and some statistics data. The NMDA allows definition of a new configuration datastore, for example, a historical configuration datastore defined in embodiments of the present disclosure.

YANG was initially designed as a data modeling language for NETCONF.

YANG model: A data model established using the YANG data modeling language is referred to as a YANG model. The YANG model can be maintained by a NETCONF client and a server. The YANG model uses a tree structure to construct data, where the data can be managed by a NETCONF or RESTCONF protocol. Data instantiated using the YANG model can be stored in XML or JSON encoding format.

A system architecture used in embodiments of the present disclosure is described below. It should be noted that the network architecture and the service scenario described in embodiments of the present disclosure are intended to describe the technical solutions in embodiments of the present disclosure more clearly, and do not constitute a limitation on the technical solutions provided in embodiments of the present disclosure. A person of ordinary skill in the art may know that: With evolution of the network architecture and the emergence of new service scenarios, the technical solutions provided in embodiments of the present disclosure are also applicable to similar technical problems.

FIG. 1 is an architectural diagram of a system related to a configuration management method according to an embodiment of the present disclosure. The system may be referred to as a configuration management system, a network management system (NMS), a NETCONF system, or the like. Refer to FIG. 1. The system includes a server 101 and one or more clients. In FIG. 1, an example in which the system includes a client 102 and a client 103 is used for schematic description. In this embodiment of the present disclosure, each client is connected to the server 101 in a wired or wireless manner to perform communication. As shown in FIG. 1, both the client 102 and the client 103 communicate with the server 101 over an Internet Protocol (IP) network.

The server 101 is configured to receive a NETCONF configuration management request, and perform configuration management on configuration data of the server 101 based on the received NETCONF configuration management request and according to the configuration management method provided in embodiments of the present disclosure. The configuration management includes configuration commission, configuration update (for example, configuration delivery), configuration update cancellation, commission cancellation, configuration copying, configuration backup, configuration rollback (namely, configuration restoration), configuration query (namely, configuration retrieval), and the like. The configuration commission is used as an example. The server 101 is configured to receive a NETCONF configuration commission request sent by a first client, and perform configuration commission based on the NETCONF configuration commission request. The configuration update is used as an example. The server is configured to receive a NETCONF configuration update request sent by the first client, and perform configuration update based on the NETCONF configuration update request. The first client is any client configured to perform configuration management on the server 101 in the system.

The first client is configured to send a NETCONF configuration management request to the server, to perform configuration management on the server 101 by using the configuration management method provided in embodiments of the present disclosure.

Optionally, the system includes a plurality of servers. Each server can establish a communication connection to at least one client, to perform configuration management by using the connected client, and any client can perform configuration management on the at least one server. In this embodiment of the present disclosure, configuration management on one server is used as an example for description, and a principle of configuration management on other servers is similar.

In this embodiment of the present disclosure, the client may be installed and deployed on any computer device, for example, a server, a desktop computer, a notebook computer, or a mobile phone, or may be installed and deployed on a computing and storage resource of a cloud platform. The server may be a network device such as a router, a switch, a gateway, or a firewall. Optionally, the client may perform configuration management on the server by running an application program, a web page, or the like. For example, an administrator (also referred to as a network operation and maintenance engineer, a network management system, a user, or the like) and/or a tenant edit/edits, commit/commits, and query/queries configuration data by using an application program running on the client.

Figure 2:
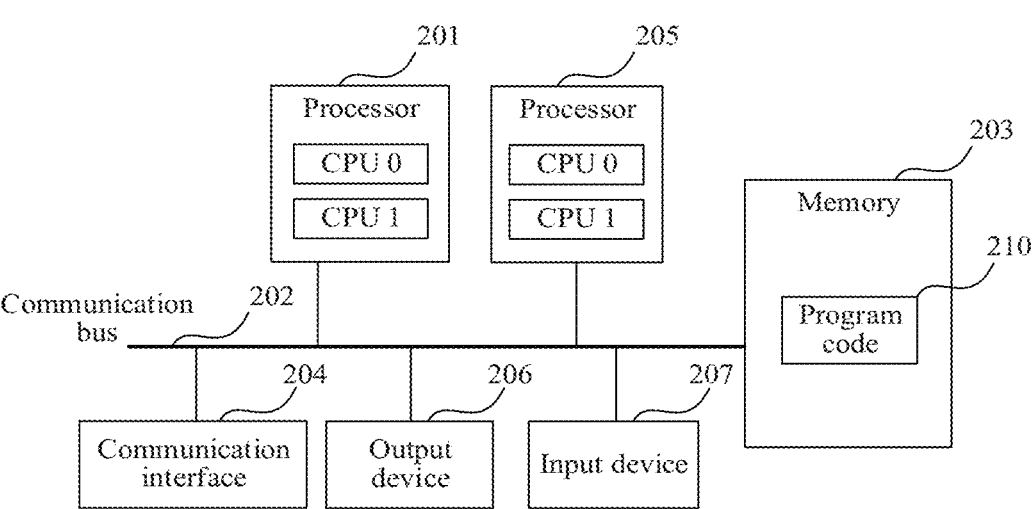
FIG. 2 is a diagram of a structure of a communication device according to an embodiment of the present disclosure.

Refer to FIG. 2. FIG. 2 is a diagram of a structure of a communication device according to an embodiment of the present disclosure. Optionally, the communication device is either client or the server shown in FIG. 1, and the communication device includes one or more processors 201, a communication bus 202, a memory 203, and one or more communication interfaces 204.

The processor 201 is a general-purpose central processing unit (CPU), a network processor (NP), a microprocessor, or one or more integrated circuits configured to implement the solutions of the present disclosure, for example, an application-specific integrated circuit (ASIC), a programmable logic device (PLD), or a combination thereof. Optionally, the PLD is a complex programmable logic device (CPLD), a field-programmable gate array (FPGA), generic array logic (GAL), or any combination thereof.

The communication bus 202 is for transferring information between the foregoing components. Optionally, the communication bus 202 may be classified as an address bus, a data bus, a control bus, and the like. For ease of representation, only one thick line is used to represent the bus in the figure, but this does not mean that there is only one bus or only one type of bus.

Optionally, the memory 203 is a read-only memory (ROM), a random-access memory (RAM), an electrically erasable programmable ROM (EEPROM), an optical disc (including a compact disc-ROM (CD-ROM), a compact disc, a laser disc, a digital versatile disc, a BLU-RAY® disc, or the like), a magnetic disk storage medium or another magnetic storage device, or any other medium that can be configured to carry or store expected program code in a form of an instruction or a data structure and that can be accessed by a computer. However, this does not constitute a limitation herein. The memory 203 exists independently, and is connected to the processor 201 through the communication bus 202, or the memory 203 is integrated with the processor 201.

The communication interface 204 is configured to communicate with another device or a communication network by using any apparatus such as a transceiver. The communication interface 204 includes a wired communication interface, or may optionally include a wireless communication interface. The wired communication interface is, for example, an Ethernet interface. Optionally, the Ethernet interface is an optical interface, an electrical interface, or a combination thereof. The wireless communication interface is a wireless local area network (WLAN) interface, a cellular network communication interface, a combination thereof, or the like.

Optionally, in some embodiments, the communication device includes a plurality of processors, for example, a processor 201 and a processor 205 shown in FIG. 2. Each of these processors is a single-core processor or a multi-core processor. Optionally, the processor herein is one or more devices, circuits, and/or processing cores for processing data (for example, computer program instructions).

In specific implementation, in an embodiment, the communication device further includes an output device 206 and an input device 207. The output device 206 communicates with the processor 201, and may display information in a plurality of manners. For example, the output device 206 is a liquid-crystal display (LCD), a light-emitting diode (LED) display device, a cathode-ray tube (CRT) display device, or a projector. The input device 207 communicates with the processor 201, and may receive an input from a user in a plurality of manners. For example, the input device 207 is a mouse, a keyboard, a touchscreen device, or a sensing device.

In some embodiments, the memory 203 is configured to store program code 210 for executing the solutions of the present disclosure, and the processor 201 may execute the program code 210 stored in the memory 203. The program code includes one or more software modules. The communication device can implement, by using the processor 201 and the program code 210 in the memory 203, a configuration management method provided in the following embodiment in FIG. 3.

The following describes a configuration management method provided in embodiments of the present disclosure.

First, it should be noted that in another technology, configuration management of different data sources affects each other. Configuration commission is used as an example. It is assumed that an application 1 on a client sends an editing request, and updates configuration data 1 from the application 1 to a candidate configuration datastore, but the application 1 has not sent a configuration commission request. In this case, an application 2 on the client sends a configuration commission request, to expect to commit configuration data 2 from the application 2 in the candidate configuration datastore. However, the configuration commission request causes forced commission of the configuration data 1 from the application 1. Similarly, configuration rollback, configuration restoration, and the like between different data sources in the other technology affect each other. It can be learned that a configuration management method in the other technology is not flexible enough.

In embodiments of the present disclosure, to reduce mutual impact of configuration management between different data sources, for example, a first client performs configuration management on a server, a NETCONF configuration management request sent by the first client to the server carries an identifier of a specified first data source, to perform configuration management on configuration data from the first data source. The first data source indicates a source or a home of the configuration data, and the first data source includes one or more of a first tenant, a first service, a first application, a first session, the first client, and a first administrator. The first tenant is any tenant leasing the server, the first service is any service on the first client, the first session is a session established between the first client and the server, the first client is any client that performs configuration management on the server, and the first administrator is any user using the first client. Optionally, the first service corresponds to the first application (APP), the first application is any application on the first client, and the first service may be identified by using an identifier (ID) or a name of the first service, or may be identified by using an ID of the first application. The first tenant may be identified by using an ID or a name of the first tenant. The first client may be identified by using an ID, a name, an IP address, or a name of the first client. For example, if the configuration data is data configured by the first administrator of the first tenant, the first data source includes the first tenant and the first administrator. In short, data sources in this solution include a tenant, a service, an application, a session, a client, and an administrator (also referred to as a user). The data sources are differentiated to implement refined configuration management.

It can be learned from the foregoing that the configuration management in this solution includes configuration commission, configuration update, configuration update cancellation, commission cancellation, configuration copying, configuration backup, configuration rollback, configuration query, and the like. The following describes the content in detail.

First, the configuration commission in this solution is described by using step 301 to step 303 shown in FIG. 3.

FIG. 3 is a flowchart of a configuration management method according to an embodiment of the present disclosure. The method is applied to a configuration management system. Refer to FIG. 3. The method includes the following steps.

Step 301: A first client sends a NETCONF configuration commission request to a server, where the NETCONF configuration commission request includes an identifier of a first data source.

In this embodiment of the present disclosure, to prevent some configuration data that is not expected to be committed from being forcibly committed when configuration data from the first data source is committed, the NETCONF configuration commission request sent by the first client to the server includes the identifier of the first data source, to specify that configuration commission is performed on the configuration data from the first data source. For a description of the first data source, refer to the foregoing content.

Optionally, in this embodiment of the present disclosure, a NETCONF protocol is extended, so that the first client can request, by using the NETCONF configuration commission request, the server to perform configuration commission for a specified data source (for example, the first data source). For example, a parameter <data-source> is added to a commit operation, and the parameter <data-source> is for carrying an identifier of a specified data source. It should be noted that the commit operation indicates, by default, to commit configuration data in a candidate configuration datastore to a running configuration datastore.

For example, when the server does not support a commission confirmation mechanism, for example, not supporting a: confirmed-commit: 1.1 capability, the NETCONF configuration commission request sent by the first client to the server includes the following information: <commit> indicates to perform a commit operation, parameters in <commit> include <data-source>, and the parameter <data-source> is for carrying the identifier of the first data source. In this example, the identifier of the first data source is 'XXX', and 'XXX' may be an identifier of an administrator, a tenant, a service, or the like.

```
<rpc message-id="101"
    xmlns="urn:ietf:params:xml:ns:netconf:base:1.0">
    <commit>
        <data-source>XXX</data-source>
    </commit>
</rpc>
```

When the server supports a commission confirmation mechanism, for example, supporting a: confirmed-commit: 1.1 capability, the NETCONF configuration commission request sent by the first client to the server includes the following information: Different from the foregoing example, the parameters in <commit> in the NETCONF configuration commission request further include <confirmed/> and <confirm-timeout>. <confirmed/> indicates that a client needs to perform commission confirmation before timeout, and <confirm-timeout> is for carrying timeout indication information. For example, the timeout indication information is '120', indicating that commission confirmation needs to be performed within 120 s. It should be noted that if <commit> does not carry <confirm-timeout>, it indicates that the client needs to perform commission confirmation within default duration, and the default duration is 600 s.

```
<rpc message-id="101"
    xmlns="urn:ietf:params:xml:ns:netconf:base:1.0">
    <commit>
        <data-source>XXX</data-source>
        <confirmed/>
        <confirm-timeout>120</confirm-timeout>
    </commit>
</rpc>
```

Optionally, if the NETCONF configuration commission request sent by the first client to the server does not include an identifier of any data source, it indicates that all configuration data in the candidate configuration datastore is committed by default. For example, the extended parameter <data-source> is optional. If the commit operation does not carry the parameter <data-source>, it indicates that all configuration data in the candidate configuration datastore is committed by default.

Step 302: The server receives the NETCONF configuration commission request sent by the first client.

Step 303: The server commits, based on the identifier of the first data source, the configuration data that comes from the first data source and that is in the candidate configuration datastore to the running configuration datastore, where configuration data in the candidate configuration datastore comes from at least one data source, and the at least one data source includes the first data source.

In this embodiment of the present disclosure, after receiving the NETCONF configuration commission request sent by the first client, the server obtains the identifier of the first data source in the NETCONF configuration commission request, determines, from the candidate configuration datastore based on the identifier of the first data source, the configuration data that comes from the first data source, and commits the configuration data that comes from the first data source and that is in the candidate configuration datastore to the running configuration datastore.

The server records a correspondence between the first data source and the configuration data that comes from the first data source and that is in the candidate configuration datastore, and the server determines, from the candidate configuration datastore based on the correspondence, the configuration data that comes from the first data source. It should be noted that the configuration data in the candidate configuration datastore comes from at least one data source. If the at least one data source includes the first data source, the server can commit, to the running configuration datastore, the configuration data that comes from the first data source and that is in the candidate configuration datastore, that is, the server can successfully perform a commit operation. If the at least one data source does not include the first data source, the server cannot successfully perform a commit operation. Optionally, when the server successfully performs the commit operation, the server sends a configuration commission response to the first client, where the configuration commission response indicates that the configuration commission succeeds. Optionally, when the server does not successfully perform the commit operation, the server sends a configuration commission response to the first client, where the configuration commission response indicates that the configuration commission fails.

For example, the configuration commission response sent by the server to the first client after committing, to the running configuration datastore, the configuration data that comes from the first data source and that is in the candidate configuration datastore includes the following information: <ok/> indicates that the configuration commission succeeds.

```
<rpc-reply message-id="101"
    xmlns="urn:ietf:params:xml:ns:netconf:base:1.0">
    <ok/>
</rpc-reply>
```

Optionally, the configuration commission response sent by the server to the first client includes a commission number (for example, commit-id), and the commission number is randomly allocated by the server. The commission number is used by the first client to perform a commission cancellation operation based on the commission number. The commission cancellation operation is described in detail in the following step 601 to step 603. For example, commit-id is used to represent the commission number. The configuration commission response sent by the server to the first client includes the following information: commit-id is 45302, and the commission number indicates that a corresponding commit operation is performed when the first client specifies to commit the first data source.

```
<rpc-reply message-id="101"
    xmlns="urn:ietf:params:xml:ns:netconf:base:1.0">
<ok commit-id="45302"/>
</rpc-reply>
```

Optionally, in addition to the identifier of the first data source, the NETCONF configuration commission request sent by the first client to the server may further include an identifier of another data source. In other words, one NETCONF configuration commission request may include an identifier of one or more data sources, to indicate the server to commit configuration data that comes from the one or more data sources and that is in the candidate configuration datastore to the running configuration datastore. In short, the first client may specify to commit configuration data of one or more data sources at a time. For example, the NETCONF configuration commission request includes an identifier of a first service and an identifier of a second service.

It should be noted that, when the server does not support the commission confirmation mechanism, the configuration data that comes from the first data source and that is in the candidate configuration datastore takes effect immediately after the server commits the configuration data to the running configuration datastore. When the server does not support the commission confirmation mechanism, after the server commits the configuration data that comes from the first data source and that is in the candidate configuration datastore to the running configuration datastore, if the server receives, before timeout, a NETCONF configuration commission confirmation request sent by the first client, the server determines that the committed configuration data takes effect. If the NETCONF configuration commission confirmation request sent by the first client is still not received after timeout, the server determines to cancel the committed configuration data.

The following describes the configuration update in this solution by using step 401 to step 403.

Step 401: The first client sends a NETCONF configuration update request to the server, where the NETCONF configuration update request includes an identifier of a second data source and first configuration data.

In this embodiment of the present disclosure, the NETCONF configuration update request sent by the first client to the server also includes an identifier of a specified data source, to indicate that current data with a configuration updated comes from the data source. For example, the NETCONF configuration update request includes the identifier of the second data source and the first configuration data, indicating that the first configuration data comes from the second data source.

The second data source includes one or more of a second tenant, a second service, a second session, the first client, and a second administrator. It should be noted that the second tenant is the same as or different from the first tenant, the second service is the same as or different from the first service, the second session is the same as or different from the first session, and the second administrator is the same as or different from the first administrator. In short, the second data source is the same as or different from the first data source.

It should be noted that the NETCONF configuration update request further includes a first target identifier, the NETCONF configuration update request indicates the server to perform configuration update on configuration data in a first target configuration datastore identified by the first target identifier, and the first target identifier is an identifier of the first target configuration datastore. For example, the first target identifier is 'running', 'candidate', or 'startup'. In short, the first client specifies, by using a target identifier, to perform configuration update on a configuration datastore, and the server performs configuration update on the specified configuration datastore based on the target identifier.

Optionally, in this embodiment of the present disclosure, the NETCONF protocol is extended, so that the first client can request, by using the NETCONF configuration update request, the server to perform configuration update for a specified data source (for example, the second data source). For example, a parameter <data-source> is added to a configuration edit operation (for example, edit-config or edit-data), and the parameter <data-source> is for carrying an identifier of a specified data source.

For example, an edit-config operation is used as an example. The NETCONF configuration commission request sent by the first client to the server includes the following information: Parameters in <edit-config> include <target>, <data-source>, and <config>. The parameter <target> is for carrying the identifier of the first target configuration datastore. In this example, the first target configuration datastore is a candidate configuration datastore. The parameter <data-source> is for carrying the identifier of the second data source. In this example, the identifier of the second data source is 'XXX'. <config> is for carrying the first configuration data.

```
<rpc message-id="101"
    xmlns="urn:ietf:params:xml:ns:netconf:base:1.0">
<edit-config>
    <target>
        <candidate/>
    </target>
    <data-source>XXX</data-source>
    <config>
        <top mlns="http://example.com/schema/1.2/config">
            <interface>
                <name>Ethernet0/0</name>
                <mtu>1500</mtu>
            </interface>
        </top>
    </config>
</edit-config>
</rpc>
```

In addition to using data-source as a new parameter of a configuration update operation according to the foregoing example, in some other implementations, the parameter data-source may alternatively be attached to a data node as a node attribute, to implement configuration update based on a specified data source. The following uses edit-config as an example to describe an example in which data-source is used as a node attribute. It should be noted that, when data-source is used as a node attribute, a child node inherits an attribute of a parent node. Therefore, if a data source is announced at the parent node, configuration data of a child node (for example, a child tree) of the parent node comes from the data source.

```
<rpc message-id="101"
    xmlns="urn:ietf:params:xml:ns:netconf:base:1.0">
<edit-config>
```

-continued

```
    <target>
      <running/>
    </target>
      <config>
        <top xmlns=http://example.com/schema/1.2/config data-
        source="XXX">
          <interface>
            <name>Ethernet0/0</name>
            <mtu>1500</mtu>
          </interface>
        </top>
      </config>
    </edit-config>
  </rpc>
```

It should be noted that, in this embodiment of the present disclosure, a RESTCONF protocol may also be extended, so that the first client can request, by using a RESTCONF configuration update request, the server to perform configuration update for a specified data source. An example of a request for an RPC operation in the RESTCONF protocol is completed by sending an HTTP request, and the HTTP request carries the identifier of the second data source, to implement configuration update for the specified second data source.

Step 402: The server receives the NETCONF configuration update request sent by the first client.

Step 403: The server updates the first configuration data to a first target configuration datastore based on the identifier of the second data source, and records a correspondence between the first data source and the first configuration data in the first target configuration datastore.

In this embodiment of the present disclosure, after receiving the NETCONF configuration commission request sent by the first client, the server obtains the identifier of the second data source in the NETCONF configuration update request, updates the first configuration data to the first target configuration datastore, and records the correspondence between the first data source and the first configuration data in the first target configuration datastore. For example, the server marks the start and end positions of the first configuration data by using the identifier of the second data source, or stores the first configuration data in a data node identified by the identifier of the second data source.

It should be noted that the NETCONF configuration update request received by the server further includes the first target identifier. The server determines the first target configuration datastore based on the first target identifier, and updates the first configuration data to the first target configuration datastore.

Optionally, after the configuration update succeeds, the server sends a configuration update response to the first client, where the configuration update response indicates that the configuration update succeeds. In some cases, the server may fail in performing configuration update. In this case, the server sends a configuration update response to the first client, where the configuration update response indicates that the configuration update fails.

For example, the configuration update response sent by the server to the first client after updating the first configuration data to the first target configuration datastore includes the following information: <ok/> indicates that the configuration update succeeds.

```
<rpc-reply message-id="101"
      xmlns="urn:ietf:params:xml:ns:netconf:base:1.0">
    <ok/>
</rpc-reply>
```

Based on the description of the configuration update (that is, configuration delivery) in step 401 to step 403, in this embodiment of the present disclosure, before sending the NETCONF configuration commission request to the server in step 301, the first client may further send a NETCONF configuration update request to the server, where the NETCONF configuration update request includes an identifier of the first data source and second configuration data, to request to perform configuration delivery on the second configuration data that comes from the first data source, that is, deliver the second configuration data to the candidate configuration datastore, so that the server records a correspondence between the first data source and the second configuration data in the candidate configuration datastore.

In other words, before sending the NETCONF configuration commission request to the server in step 301, the first client sends the NETCONF configuration update request to the server, where the NETCONF configuration update request includes the identifier of the first data source and the second configuration data. The server receives the NETCONF configuration update request, updates the second configuration data to the candidate configuration datastore, and records the correspondence between the first data source and the second configuration data in the candidate configuration datastore. Then, the first client sends the NETCONF configuration commission request to the server in step 301, where the NETCONF configuration commission request includes the identifier of the first data source. After receiving the NETCONF configuration commission request, the server can determine, from the candidate configuration datastore based on the recorded correspondence between the first data source and the second configuration data in the candidate configuration datastore, the configuration data that comes from the first data source, and then commit the configuration data that comes from the first data source.

The following describes the configuration update cancellation in this solution by using step 501 to step 503.

Step 501: The first client sends a NETCONF configuration update cancellation request to the server, where the NETCONF configuration update cancellation request includes an identifier of a third data source.

In this embodiment of the present disclosure, to avoid affecting configuration update of configuration data from another data source when configuration update of the configuration data from the third data source is canceled, the NETCONF configuration update cancellation request sent by the first client to the server includes the identifier of the third data source. It should be noted that, before sending the NETCONF configuration commission request to the server, the first client may send the NETCONF configuration update cancellation request to the server, to roll back configuration data that is in the candidate configuration datastore but not committed to the running configuration datastore, that is, discard configuration data edited in the candidate configuration datastore.

The third data source includes one or more of a third tenant, a third service, a third session, a third client, and a third administrator. It should be noted that the third tenant is the same as or different from the first tenant, the third service is the same as or different from the first service, the third session is the same as or different from the first session, and the third administrator is the same as or different from the first administrator. In short, the third data source is the same as or different from the first data source.

Optionally, in this embodiment of the present disclosure, the NETCONF protocol is extended, so that the first client can request, by using the NETCONF configuration update cancellation request, the server to cancel the configuration update for a specified data source (for example, the third data source). For example, a parameter <data-source> is added to a configuration update cancellation (discard-changes) operation, and the parameter <data-source> is for carrying an identifier of a specified data source.

For example, the NETCONF configuration update cancellation request sent by the first client to the server includes the following information: <discard-changes> indicates to perform a configuration update cancellation operation, and the parameter <data-source> is for carrying the identifier of the third data source. In this example, the identifier of the third data source is 'XXX', and 'XXX' may be an identifier of an administrator, a tenant, a service, or the like.

```
<rpc message-id="101"
    xmlns="urn:ietf:params:xml:ns:netconf:base:1.0">
    <discard-changes>
        <data-source>XXX</data-source>
    </discard-changes>
</rpc>
```

Optionally, if the NETCONF configuration update cancellation request sent by the first client to the server does not include an identifier of any data source, it indicates that configuration update of all configuration data in the running configuration datastore is canceled by default. For example, the extended parameter <data-source> is optional. If the discard-changes operation does not carry the parameter <data-source>, it indicates that all configuration data in the candidate configuration datastore is rolled back to be consistent with the configuration data in the running configuration datastore by default.

It should be noted that, in this embodiment of the present disclosure, the RESTCONF protocol may also be extended, so that the first client can request, by using a RESTCONF configuration update cancellation request, the server to cancel configuration update of configuration data that comes from a specified data source. In the RESTCONF protocol, examples of requests for configuration delivery and query operations are completed by sending an HTTP request, and the HTTP request carries the identifier of the third data source, to implement configuration update cancellation for the specified third data source.

Step 502: The server receives the NETCONF configuration update cancellation request sent by the first client.

Step 503: The server rolls back, based on the identifier of the third data source, configuration data that comes from the third data source and that is in the candidate configuration datastore to be consistent with configuration data that comes from the third data source and that is in the running configuration datastore.

In this embodiment of the present disclosure, after receiving the NETCONF configuration update cancellation request sent by the first client, the server obtains the identifier of the third data source in the NETCONF configuration update cancellation request, determines, based on the identifier of the third data source, the configuration data that comes from the third data source and that is in the candidate configuration datastore, and determines the configuration data that comes from the third data source and that is in the running configuration datastore. The server rolls back the configuration data that comes from the third data source and that is in the candidate configuration datastore to be consistent with the configuration data that comes from the third data source and that is in the running configuration datastore.

The server records a correspondence between the third data source and the configuration data that comes from the third data source and that is in the candidate configuration datastore, and further records a correspondence between the third data source and the configuration data that comes from the third data source and that is in the running configuration datastore. Based on the two correspondences, the server determines the configuration data that comes from the third data source and that is in the candidate configuration datastore, and determines the configuration data that comes from the third data source and that is in the running configuration datastore. It should be noted that, if the candidate configuration datastore includes the configuration data from the third data source, and the running configuration datastore also includes the configuration data from the third data source, the server can roll back the configuration data that comes from the third data source and that is in the candidate configuration datastore to be consistent with the configuration data that comes from the third data source and that is in the running configuration datastore. That is, the server can successfully perform the configuration update cancellation operation. If none of the configuration data in the candidate configuration datastore comes from the third data source, and/or none of the configuration data in the running configuration datastore comes from the third data source, the server cannot successfully perform the configuration update cancellation operation. Optionally, when the server successfully performs the configuration update cancellation operation, the server sends a configuration update cancellation response to the first client, where the configuration update cancellation response indicates that the configuration update cancellation succeeds. Optionally, when the server does not successfully perform the configuration update cancellation operation, the server sends a configuration update cancellation response to the first client, where the configuration update cancellation response indicates that the configuration update cancellation fails.

For example, the configuration update cancellation response sent by the server to the first client after rolling back the configuration data that comes from the third data source and that is in the candidate configuration datastore to be consistent with the configuration data that comes from the third data source and that is in the running configuration datastore includes the following information: <ok/> indicates that the configuration commission succeeds.

```
<rpc-reply message-id="101"
    xmlns="urn:ietf:params:xml:ns:netconf:base:1.0">
    <ok/>
</rpc-reply>
```

Optionally, in addition to the identifier of the third data source, the NETCONF configuration update cancellation request sent by the first client to the server may further include an identifier of another data source. In other words, one NETCONF configuration update cancellation request may include an identifier of one or more data sources, to indicate the server to cancel configuration update of configuration data that comes from the one or more data sources and that is in the candidate configuration datastore. In short, the first client may specify to cancel, at a time, configuration update of configuration data that comes from one or more data sources. For example, the NETCONF configuration update cancellation request includes an identifier of the first administrator, an identifier of the first service, and an identifier of the second service.

The following describes the configuration commission cancellation in this solution by using step 601 to step 603.

Step 601: The first client sends a NETCONF commission cancellation request to the server, where the NETCONF commission cancellation request includes an identifier of a fourth data source.

In this embodiment of the present disclosure, to avoid canceling a commit operation on configuration data from another data source when a commit operation on configuration data from the fourth data source is canceled, the NETCONF commission cancellation request sent by the first client to the server includes the identifier of the fourth data source, to specify that the commit operation on the configuration data from the fourth data source is canceled.

The fourth data source includes one or more of a fourth tenant, a fourth service, a fourth session, the first client, and a fourth administrator. It should be noted that the fourth tenant is the same as or different from the first tenant, the fourth service is the same as or different from the first service, the fourth session is the same as or different from the first session, and the fourth administrator is the same as or different from the first administrator. In short, the fourth data source is the same as or different from the first data source.

Optionally, in this embodiment of the present disclosure, the NETCONF protocol is extended, so that the first client can request, by using the NETCONF commission cancellation request, the server to cancel a commit operation on configuration data of a specified data source (for example, the fourth data source). For example, a parameter <data-source> is added to a commission cancellation (cancel-commit) operation, and the parameter <data-source> is for carrying an identifier of a specified data source.

For example, the NETCONF commission cancellation request sent by the first client to the server includes the following information: <cancel-commit> indicates to perform a commission cancellation operation, and the parameter <data-source> is for carrying the identifier of the fourth data source. In this example, the identifier of the fourth data source is 'XXX', and 'XXX' may be an identifier of an administrator, a tenant, a service, or the like.

```
<rpc message-id="102"
    xmlns="urn:ietf:params:xml:ns:netconf:base:1.0">
    <cancel-commit>
        <data-source>XXX</data-source>
    </cancel-commit>
</rpc>
```

It should be noted that, when the server supports a commission confirmation mechanism, the first client may send the NETCONF commission cancellation request to the server before timeout, so that the commit operation can be successfully canceled. For example, after the first client sends the NETCONF configuration commission request, if sending duration of the NETCONF configuration commission request does not exceed first duration, the first client sends the NETCONF commission cancellation request to the server.

Optionally, it can be learned from the related description of the configuration commission in step 303 in the foregoing embodiment that, after the first client sends the NETCONF configuration commission request, the configuration commission response sent by the server and received by the first client may include the commission number. In this case, the NETCONF commission cancellation request sent by the first client to the server may include the commission number and/or the fourth data source. For example, the NETCONF commission cancellation request includes the commission number. If the commission number is allocated when the first client specifies that configuration data from a data source is to be committed, the commission number in the NETCONF commission cancellation request indicates the server to cancel the commit operation on the configuration data from the data source. If the commission number is allocated when the first client specifies to commit the configuration data of the entire candidate configuration datastore, the commission number in the NETCONF commission cancellation request indicates the server to cancel the commit operation on the entire running configuration datastore.

For example, the NETCONF commission cancellation request sent by the first client to the server includes the following information: commit-id is 45302, and indicates the server to cancel a commit operation on configuration data of a specified data source (for example, the first data source).

```
<rpc message-id="102"
    xmlns="urn:ietf:params:xml:ns:netconf:base:1.0">
    <cancel-commit>
        <commit-id>45302</commit-id>
    </cancel-commit>
</rpc>
```

Optionally, if the NETCONF commission cancellation request sent by the first client to the server does not include an identifier of any data source, it indicates that a commit operation on all configuration data in the running configuration datastore is canceled by default. For example, the extended parameter <data-source> is optional. If the cancel-commit operation does not carry the parameter <data-source>, it indicates that the commit operation on all configuration data in the running configuration datastore is canceled by default.

Step 602: The server receives the NETCONF commission cancellation request sent by the first client.

Step 603: The server cancels, based on the identifier of the fourth data source, a commit operation on configuration data that comes from the fourth data source and that is in the running configuration datastore.

In this embodiment of the present disclosure, after receiving the NETCONF commission cancellation request sent by the first client, the server obtains the identifier of the fourth data source in the NETCONF commission cancellation request, determines, from the running configuration datastore based on the identifier of the fourth data source, the configuration data that comes from the fourth data source, and cancels the commit operation on the configuration data that comes from the fourth data source and that is in the running configuration datastore.

The server records a correspondence between the fourth data source and the configuration data that comes from the fourth data source and that is in the running configuration datastore, and the server determines, from the running configuration datastore based on the correspondence, the configuration data that comes from the fourth data source. It should be noted that, if the running configuration datastore includes the configuration data from the fourth data source, the server can cancel the commit operation on the configuration data that comes from the fourth data source and that is in the running configuration datastore, that is, the server can successfully perform the commission cancellation operation. If the running configuration datastore does not include the configuration data from the fourth data source, the server cannot successfully perform the commission cancellation operation. Optionally, when the server successfully performs the commission cancellation operation, the server sends a commission cancellation response to the first client, where the commission cancellation response indicates that the commission cancellation succeeds. Optionally, when the server does not successfully perform the commission cancellation operation, the server sends a commission cancellation response to the first client, where the commission cancellation response indicates that the commission cancellation fails.

For example, the commission cancellation response sent to the first client after the server cancels the commit operation on the configuration data that comes from the fourth data source and that is in the running configuration datastore includes the following information: <ok/> indicates that the commission cancellation succeeds.

```
<rpc-reply message-id="102"
        xmlns="urn:ietf:params:xml:ns:netconf:base:1.0">
    <ok/>
</rpc-reply>
```

Optionally, in addition to the identifier of the fourth data source, the NETCONF commission cancellation request sent by the first client to the server may further include an identifier of another data source. In other words, one NETCONF commission cancellation request may include an identifier of one or more data sources, to indicate the server to commit configuration data that comes from the one or more data sources and that is in the candidate configuration datastore to the running configuration datastore. In short, the first client may specify to cancel, at a time, the commit operation on configuration data that comes from one or more data sources. For example, the NETCONF commission cancellation request includes an identifier of the fourth administrator, an identifier of the first service, and an identifier of the second service.

It should be noted that, when the server supports a commission confirmation mechanism, the first client may send the NETCONF commission cancellation request to the server before timeout, so that the commit operation can be successfully canceled. Based on this, after the server receives the NETCONF commission cancellation request sent by the first client, if the server supports a commission confirmation mechanism, and duration between a first receiving moment and a second receiving moment does not exceed the first duration, the server cancels the commit operation on the configuration data that comes from the fourth data source and that is in the running configuration datastore. The first receiving moment is a moment at which the server recently receives a NETCONF configuration commission request sent by the first client, and the second receiving moment is a moment at which the server currently receives a NETCONF commission cancellation request sent by the first client. If the server supports the commission confirmation mechanism, but the duration between the first receiving moment and the second receiving moment exceeds the first duration, and the server does not receive a commission confirmation request from the first client yet after timeout, the server automatically cancels the commit operation on the configuration data that comes from the fourth data source and that is in the running configuration datastore. In short, the server can successfully cancel the commit operation before timeout. If the server does not receive the commission confirmation request from the client after timeout, the server automatically cancels the commit operation. If the server receives the commission confirmation request from the client before timeout, the server confirms that the commission takes effect and cannot cancel the commit operation. If the server does not support the commission confirmation mechanism, the server cannot cancel the commit operation.

The following describes the configuration copying in this solution by using step 701 to step 703.

Step 701: The first client sends a NETCONF configuration copying request to the server, where the NETCONF configuration copying request includes an identifier of a first source configuration datastore, an identifier of a fifth data source, and an identifier of a first target storage object.

In this embodiment of the present disclosure, the first client can further copy configuration data that comes from a specified data source. For example, the NETCONF configuration copying request sent by the first client to the server includes the identifier of the first source configuration datastore, the identifier of the fifth data source, and the identifier of the first target storage object, and the NETCONF configuration copying request indicates the server to copy configuration data that belongs to the fifth data source and that is in the first source configuration datastore to the first target storage object.

The fifth data source includes one or more of a fifth tenant, a fifth service, a fifth session, the first client, and a fifth administrator. It should be noted that the fifth tenant is the same as or different from the first tenant, the fifth service is the same as or different from the first service, the fifth session is the same as or different from the first session, and the fifth administrator is the same as or different from the first administrator. In short, the fifth data source is the same as or different from the first data source.

Optionally, the first source configuration datastore is any configuration datastore, for example, a candidate configuration datastore, a running configuration datastore, or a startup configuration datastore. The first target storage object includes a second target configuration datastore or a first target file, that is, the first target storage object may be a configuration datastore or a file.

Optionally, in this embodiment of the present disclosure, the NETCONF protocol is extended, so that the first client can request, by using the NETCONF configuration copying request, the server to copy configuration data that comes from a specified data source (for example, the fourth data source). For example, a parameter <data-source> is added to a configuration copying (copy-config) operation, and the parameter <data-source> is for carrying an identifier of a specified data source.

For example, the NETCONF configuration copying request sent by the first client to the server includes the following information: Parameters in <copy-config> include <data-source>, <target>, and <source>. The parameter <data-source> is for carrying the identifier of the fifth data source. In this example, the identifier of the fifth data source is 'XXX'. The parameter <target> is for carrying the identifier of the first target storage object. In this example, the first target storage object is a first target file, and an identifier of the first target file is 'https://user:password@example.com/cfg/new.txt'. The parameter <source> is for carrying the identifier of the first source configuration datastore. In this example, the first source configuration datastore is a running configuration datastore.

```
<rpc message-id="103"
      xmlns="urn:ietf:params:xml:ns:netconf:base:1.0">
  <copy-config>
    <data-source>XXX</data-source>
    <target>
        <url>https://user:password@example.com/cfg/new.txt</url>
    </target>
    <source>
        <running/>
    </source>
  </copy-config>
</rpc>
```

Optionally, if the NETCONF configuration copying request sent by the first client to the server does not include an identifier of any data source, it indicates that all configuration data in the first source configuration datastore is copied to the first target storage object by default. For example, the extended parameter <data-source> is optional. If the copy-config operation does not carry the parameter <data-source>, it indicates that all configuration data in the first source configuration datastore is copied to the first target storage object by default.

Step 702: The server receives the NETCONF configuration copying request sent by the first client.

Step 703: The server copies, based on the identifier of the first source configuration datastore, the identifier of the fifth data source, and the identifier of the first target storage object, configuration data that comes from the fifth data source and that is in the first source configuration datastore to the first target storage object.

In this embodiment of the present disclosure, after receiving the NETCONF configuration copying request sent by the first client, the server obtains the identifier of the first source configuration datastore, the identifier of the fifth data source, and the identifier of the first target storage object in the NETCONF configuration copying request, determines, from the first source configuration datastore, the configuration data that comes from the fifth data source, and copies the configuration data that comes from the fifth data source and that is in the first source configuration datastore to the first target storage object, that is, overwrites data in the first target storage object by using the configuration data that comes from the fifth data source and that is in the first source configuration datastore.

The server records a correspondence between the fifth data source and the configuration data that comes from the fifth data source and that is in the first source configuration datastore, and the server determines, from the first source configuration datastore based on the correspondence, the configuration data that comes from the fifth data source. It should be noted that, if the first source configuration datastore includes the configuration data from the fifth data source, the server can successfully perform copying. If the first source configuration datastore does not include the configuration data from the fifth data source, the server cannot successfully perform copying. Optionally, when the server successfully performs copying, the server sends a configuration copying response to the first client, where the configuration copying response indicates that the copying succeeds. When the server does not successfully perform copying, the server sends a configuration copying response to the first client, where the configuration copying response indicates that the copying fails.

For example, the configuration copying response sent by the server to the first client after copying the configuration data that comes from the fifth data source and that is in the first source configuration datastore to the first target storage object includes the following information: <ok/> indicates that the copying succeeds.

```
<rpc-reply message-id="103"
      xmlns="urn:ietf:params:xml:ns:netconf:base:1.0">
  <ok/>
</rpc-reply>
```

Optionally, in addition to the identifier of the fifth data source, the NETCONF configuration copying request sent by the first client to the server may further include an identifier of another data source. In other words, the NETCONF configuration copying request may include an identifier of one or more data sources, to indicate the server to copy configuration data that comes from the one or more data sources and that is in the first source configuration datastore. In short, the first client may specify to copy, at a time, configuration data that comes from one or more data sources. For example, the NETCONF configuration copying request includes an identifier of the fifth administrator, an identifier of the first tenant, and an identifier of the fifth tenant.

In some other embodiments, the first client sends the NETCONF configuration copying request to the server, where the NETCONF configuration copying request includes the identifier of the first source configuration datastore, the identifier of the fifth data source, and the identifier of the first target storage object. The server receives the NETCONF configuration copying request sent by the first client. The server overwrites, based on the identifier of the first source configuration datastore, the identifier of the fifth data source, and the identifier of the first target storage object, the configuration data that comes from the fifth data source and that is in the first target storage object by using configuration data in the first source configuration datastore.

The following describes the configuration backup in this solution by using step 801 to step 803.

Step 801: The first client sends a NETCONF backup creation request to the server, where the NETCONF backup creation request includes an identifier of a sixth data source.

In this embodiment of the present disclosure, the first client can further request the server to back up configuration data that comes from a specified data source. For example, the NETCONF backup creation request (also referred to as a snapshot creation request) sent by the first client to the server includes the identifier of the sixth data source, to request to back up the configuration data from the sixth data source.

The sixth data source includes one or more of a sixth tenant, a sixth service, a sixth session, the first client, and a sixth administrator. It should be noted that the sixth tenant is the same as or different from the first tenant, the sixth service is the same as or different from the first service, the sixth session is the same as or different from the first session, and the sixth administrator is the same as or different from the first administrator. In short, the sixth data source is the same as or different from the first data source.

Optionally, the NETCONF backup creation request further includes an identifier of a second source configuration datastore, and the NETCONF backup creation request indicates the server to back up configuration data in the second source configuration datastore corresponding to the identifier. The identifier of the second source configuration datastore may be an identifier of any configuration datastore, for example, an identifier of a running configuration datastore, a candidate configuration datastore, or an operational configuration datastore. When the NETCONF backup creation request does not include the identifier of the second source configuration datastore, the NETCONF backup creation request indicates the server to back up configuration data in a default source configuration datastore, where the default source configuration datastore is the second source configuration datastore. The default source configuration datastore is a running configuration datastore, a candidate configuration datastore, or the like.

Optionally, the NETCONF backup creation request further includes an identifier of a second target storage object, and the NETCONF backup creation request indicates the server to back up configuration data to the second target storage object. The second target storage object includes a sixth target configuration datastore or a second target file, and the sixth target configuration datastore is, for example, a historical configuration datastore. When the NETCONF backup creation request does not include the identifier of the second target storage object, the NETCONF backup creation request indicates the server to back up configuration data to a default target storage object, where the default target storage object is the second target storage object. The default target storage object is a historical configuration datastore or a specified file. It should be noted that the historical configuration datastore is a datastore that is extended in this solution to store backup configuration data. Certainly, the backup configuration data may also be stored in another configuration datastore or file. This is not limited in this embodiment of the present disclosure.

Optionally, in this embodiment of the present disclosure, the NETCONF protocol is extended, so that the first client can request, by using the NETCONF backup creation request, the server to back up configuration data that comes from a specified data source (for example, the sixth data source). For example, a create-snapshot operation is defined for a client to request the server to perform configuration backup. A parameter <data-source> is added to a create-snapshot operation, and the parameter <data-source> is for carrying an identifier of a specified data source.

Optionally, parameters in <create-snapshot> further include <target>, <name>, <label>, <description>, and the like. The parameter <target> is for carrying the identifier of the second source configuration datastore, for example, 'running'. The parameter <name> is for specifying a backup name. The backup name may be set according to a specified naming rule, or there may not be a specified naming rule. The parameter <label> is for carrying a backup label, and the backup label may be any label, for example, a creator and/or a backup purpose. The creator is, for example, admin, where admin indicates that the creator is an administrator user. In other words, the creator is a client. Alternatively, based on different clients, creators are admin1, admin2, and the like, where admin1 indicates that the creator is a client 1, and admin2 indicates that the creator is a client 2. The backup purpose is, for example, rescue, where rescue indicates a purpose of emergency fault recovery. The parameter <description> is for carrying a backup description, where the backup description is prompt information or description information of corresponding backup data.

It should be noted that the four parameters <target>, <name>, <label>, and <description> are all optional. If <create-snapshot> in the NETCONF backup creation request received by the server does not contain the parameter <name>, the server backs up the configuration data in the running configuration datastore by default. If <create-snapshot> in the NETCONF backup creation request received by the server does not contain the parameter <name>, the server can automatically generate a backup name. For example, the server generates a backup name according to a specified naming rule. When <create-snapshot> in the NETCONF backup creation request received by the server does not include the parameter <label>, metadata corresponding to backup configuration data generated by the server does not include a backup label, the backup label is null, or the server automatically sets the backup label in the corresponding metadata to 'admin'. If <create-snapshot> in the NETCONF backup creation request received by the server does not include the parameter <description>, the metadata corresponding to the backup configuration data generated by the server does not include a backup description, or the backup description is null.

For example, the NETCONF backup creation request sent by the first client to the server includes the following information:

```
<create-snapshot>
    <name>admin__2021-09-26</name>
    <data-source>XXX</data-source>
    <label>admin, rescue</label>
    <description>This is used to revert current configuration when an error
encountered</description>
</create-snapshot>
```

Optionally, if the NETCONF backup creation request sent by the first client to the server does not include an identifier of any data source, it indicates that all configuration data in the second source configuration datastore is backed up by default. For example, the extended parameter <data-source> is optional. If the create-snapshot operation does not carry the parameter <data-source>, it indicates that all configuration data in the second source configuration datastore is backed up by default.

It should be noted that, in this embodiment of the present disclosure, the RESTCONF protocol may also be extended, so that the first client can request, by using a RESTCONF backup creation request, the server to back up configuration data that comes from a specified data source. An example of a request for an RPC operation in the RESTCONF protocol is completed by sending an HTTP request, and the HTTP request carries the identifier of the sixth data source, to implement a configuration backup operation for the specified sixth data source.

Step 802: The server receives the NETCONF backup creation request sent by the first client.

Step 803: The server backs up, based on the identifier of the sixth data source, configuration data that comes from the sixth data source and that is in the second source configuration datastore, to generate one piece of backup configuration data.

In this embodiment of the present disclosure, after receiving the NETCONF backup creation request sent by the first client, the server obtains the identifier of the sixth data source in the NETCONF backup creation request, determines, from the second source configuration datastore, the configuration data that comes from the sixth data source, and backs up the configuration data that comes from the sixth data source and that is in the second source configuration datastore. Optionally, the server backs up the configuration data that comes from the sixth data source and that is in the second source configuration datastore to the second target storage object.

The server records a correspondence between the sixth data source and the configuration data that comes from the sixth data source and that is in the second source configuration datastore, and the server determines, from the second source configuration datastore based on the correspondence, the configuration data that comes from the sixth data source. It should be noted that, if the second source configuration datastore includes the configuration data from the sixth data source, the server can successfully perform backup. If the second source configuration datastore does not include the configuration data from the sixth data source, the server cannot successfully perform backup. Optionally, when the server successfully performs backup, the server sends a configuration backup response to the first client, where the configuration backup response indicates that the backup succeeds. When the server does not successfully perform backup, the server sends a configuration backup response to the first client, where the configuration backup response indicates that the backup fails.

For example, the configuration backup response sent by the server to the first client after backing up the configuration data that comes from the sixth data source and that is in the second source configuration datastore includes the following information: <ok/> indicates that the backup succeeds.

```
<rpc-reply message-id="103"
    xmlns="urn:ietf:params:xml:ns:netconf:base:1.0">
  <ok/>
</rpc-reply>
```

Optionally, in addition to the identifier of the sixth data source, the NETCONF backup creation request sent by the first client to the server may further include an identifier of another data source. In other words, the NETCONF backup creation request may include an identifier of one or more data sources, to indicate the server to back up configuration data that comes from the one or more data sources and that is in the second source configuration datastore. In short, the first client may specify to back up, at a time, configuration data that comes from one or more data sources. For example, the NETCONF backup creation request includes an identifier of the sixth administrator, an identifier of the first tenant, and an identifier of the sixth tenant.

The following describes the configuration rollback in this solution by using step 901 and step 902.

Step 901: The first client sends a NETCONF configuration rollback request to the server, where the NETCONF configuration rollback request includes an identifier of first backup configuration data and an identifier of a seventh data source.

It should be noted that, in this embodiment of the present disclosure, the server stores one or more pieces of backup configuration data, and the backup configuration data may be for configuration rollback. Any one of the pieces of backup configuration data is a piece of configuration data created by using a NETCONF backup creation request sent by the client, is automatically created by the server within preset time, is automatically created by the server after configuration update, is a piece of configuration data copied by using a NETCONF configuration copying request sent by the client, or is a piece of configuration data manually copied by an administrator.

When configuration rollback needs to be performed, the first client may roll back configuration data of a specified data source. For example, the NETCONF configuration rollback request sent by the first client to the server includes the identifier of the first backup configuration data and the identifier of the seventh data source, to request to roll back configuration data from the seventh data source by using the first backup configuration data.

The first backup configuration data is one of the one or more pieces of backup configuration data. The seventh data source includes one or more of a seventh tenant, a seventh service, a seventh session, the first client, and a seventh administrator. It should be noted that the seventh tenant is the same as or different from the first tenant, the seventh service is the same as or different from the first service, the seventh session is the same as or different from the first session, and the seventh administrator is the same as or different from the first administrator. In short, the seventh data source is the same as or different from the first data source.

Optionally, the NETCONF configuration rollback request further includes an identifier of a third target configuration datastore, and the identifier of the third target configuration datastore indicates the server to roll back configuration data that comes from the seventh data source and that is in the third target configuration datastore. When the NETCONF configuration rollback request does not include the identifier of the third target configuration datastore, the NETCONF configuration rollback request indicates the server to roll back configuration data that comes from the seventh data source and that is in a default target configuration datastore, where the default target configuration datastore is the third target configuration datastore. Optionally, the default target configuration datastore is a running configuration datastore.

Optionally, in this embodiment of the present disclosure, the NETCONF protocol is extended, so that the first client can request, by using the NETCONF configuration rollback request, the server to roll back configuration data that comes from a specified data source (for example, the seventh data source). For example, a recover-config operation (for example, recover-snapshot) is defined for a client to request the server to perform configuration rollback. A parameter <data-source> is added to the recover-config operation, and the parameter <data-source> is for carrying an identifier of a specified data source.

For example, the recover-snapshot operation is used as an example. The NETCONF configuration rollback request sent by the first client to the server includes the following information: A parameter <name> is for carrying a name of the first backup configuration data. In this example, the identifier of the first backup configuration data is a name of the first backup configuration data. In some other embodiments, the identifier of the first backup configuration data may alternatively be creation time of the first backup configuration data or another unique identifier. The parameter <data-source> is for carrying the identifier of the seventh data source. In this example, the identifier of the seventh data source is 'XXX'.

```
<recover-snapshot>
    <name>admin_2021-09-26</name>
    <data-source>XXX</data-source>
</recover-snapshot>
```

Optionally, if the NETCONF backup creation request sent by the first client to the server does not include an identifier of any data source, it indicates that all configuration data in the third target configuration datastore is replaced with the first backup configuration data by default. That is, if no data source is specified, an entire configuration datastore is recovered by default. For example, the extended parameter <data-source> is optional. If the recover-config operation does not carry the parameter <data-source>, it indicates that the entire third target configuration datastore is rolled back by default.

It should be noted that, in this embodiment of the present disclosure, the RESTCONF protocol may also be extended, so that the first client can request, by using a RESTCONF configuration rollback request, the server to roll back configuration data of a specified data source. An example of a request for an RPC operation in the RESTCONF protocol is completed by sending an HTTP request, and the HTTP request carries the identifier of the seventh data source, to implement a configuration rollback operation for the specified seventh data source.

Step 902: The server receives the NETCONF configuration rollback request sent by the first client.

Step 903: The server rolls back, based on the identifier of the first backup configuration data and the identifier of the seventh data source, the configuration data that comes from the seventh data source and that is in the third target configuration datastore to be consistent with the first backup configuration data.

In this embodiment of the present disclosure, after receiving the NETCONF configuration rollback request sent by the first client, the server obtains the identifier of the seventh data source in the NETCONF configuration rollback request, determines, from the third target configuration datastore, the configuration data that comes from the seventh data source, and replaces the configuration data that comes from the seventh data source and that is in the third target configuration datastore with the first backup configuration data, that is, rolls back the configuration data that comes from the seventh data source and that is in the third target configuration datastore to be consistent with the first backup configuration data.

The server records a correspondence between the seventh data source and the configuration data that comes from the seventh data source and that is in the third target configuration datastore, and the server determines, from the third target configuration datastore based on the correspondence, the configuration data that comes from the seventh data source. It should be noted that, if the third target configuration datastore includes the configuration data from the seventh data source, the server can successfully perform configuration rollback. If the third target configuration datastore does not include the configuration data from the seventh data source, the server cannot successfully perform configuration rollback. Optionally, when the server successfully performs configuration rollback, the server sends a configuration rollback response to the first client, where the configuration rollback response indicates that the configuration rollback succeeds. When the server does not successfully perform configuration rollback, the server sends a configuration rollback response to the first client, where the configuration rollback response indicates that the configuration rollback fails.

For example, the configuration rollback response sent to the first client after the server rolls back the configuration data that comes from the seventh data source and that is in the third target configuration datastore to be consistent with the first backup configuration data includes the following information: <ok/> indicates that the configuration rollback succeeds.

<rpc-reply message-id="103"
    xmlns="urn:ietf:params:xml:ns:netconf:base:1.0">
</rpc-reply>

The following describes the configuration query (that is, configuration retrieval) in this solution by using step 1001 to step 1005.

Step 1001: The first client sends a NETCONF configuration query request to the server, where the NETCONF configuration query request includes an identifier of an eighth data source.

In this embodiment of the present disclosure, the first client can further request, by specifying an identifier of a data source, to query some configuration data in a configuration datastore. For example, the NETCONF configuration query request sent by the first client to the server includes the identifier of the eighth data source, to request to query configuration data from the eighth data source.

The eighth data source includes one or more of an eighth tenant, an eighth service, an eighth session, the first client, and an eighth administrator. It should be noted that the eighth tenant is the same as or different from the first tenant, the eighth service is the same as or different from the first service, the eighth session is the same as or different from the first session, and the eighth administrator is the same as or different from the first administrator. In short, the eighth data source is the same as or different from the first data source.

Optionally, in addition to the identifier of the eighth data source, the NETCONF configuration query request may further include an identifier of another data source. In other words, the NETCONF configuration query request may include an identifier of one or more data sources, to query configuration data that comes from the one or more data sources. In short, the first client may specify to query, at a time, configuration data that comes from one or more data sources. For example, the NETCONF configuration query request includes an identifier of the fourth administrator, an identifier of the first service, and an identifier of the second tenant.

Optionally, the NETCONF configuration query request further includes an identifier of a third source configuration datastore, to indicate the server to query configuration data from the third source configuration datastore. When the NETCONF configuration query request does not include the identifier of the third source configuration datastore, the NETCONF configuration query request indicates the server to query configuration data from a default source configuration datastore. The default source configuration datastore is the third source configuration datastore. Optionally, the default source configuration datastore is a running configuration datastore, a candidate configuration datastore, or the like.

Optionally, in this embodiment of the present disclosure, the NETCONF protocol is extended, so that the first client can request, by using the NETCONF configuration query request, the server to query configuration data that comes from a specified data source. For example, a parameter </with-data-source> and a parameter <source-filter> are added to a get-config operation, a get-data operation, or a get operation. The parameter </with-data-source> is optional, the parameter </with-data-source> indicates that an identifier of a data source is attached to a configuration query response, the parameter <source-filter> is also optional, and the parameter <source-filter> is for carrying an identifier of a specified data source.

For example, the get-config operation is used as an example. The NETCONF configuration query request sent by the first client to the server includes the following information: The parameter <source> is for carrying the identifier of the third source configuration datastore. In this example, the third source configuration datastore is a running configuration datastore, indicating that configuration data in the running configuration datastore is requested to be queried. The get-config operation includes two parameters <source-filter>, and identifiers of data sources carried in the two parameters <source-filter> are 'XXX' and 'YYY', indicating that configuration data from the two data sources is requested to be queried.

```
<rpc xmlns="urn:ietf:params:xml:ns:netconf:base:1.0">
   <get-config>
      <source>
         <running/>
      </source>
         <source-filter>XXX</source-filter>
         <source-filter>YYY</source-filter>
         </with-data-source>
   </get-config>
</rpc>
```

Optionally, if the NETCONF configuration query request sent by the first client to the server does not include an identifier of any data source, it indicates that all configuration data in the third source configuration datastore is queried by default. For example, the extended parameter </with-data-source> and the parameter <source-filter> are optional. If the recover-config operation does not carry the parameter </with-data-source> and the parameter <source-filter>, it indicates that all configuration data in the third source configuration datastore is queried by default.

It should be noted that, in this embodiment of the present disclosure, the RESTCONF protocol may also be extended, so that the first client can request, by using a RESTCONF configuration query request, the server to query configuration data of a specified data source. An example of a request for an RPC operation in the RESTCONF protocol is completed by sending an HTTP request, and the HTTP request carries the identifier of the eighth data source, to implement a configuration query operation for the specified eighth data source.

Step 1002: The server receives the NETCONF configuration query request sent by the first client.

Step 1003: The server queries, based on the identifier of the eighth data source, the third source configuration datastore for the configuration data that comes from the eighth data source, to obtain a query result.

In this embodiment of the present disclosure, after receiving the NETCONF configuration query request sent by the first client, the server obtains the identifier of the eighth data source in the NETCONF configuration query request, and queries the third source configuration datastore for the configuration data that comes from the eighth data source, to obtain the query result.

The server records a correspondence between the eighth data source and the configuration data that comes from the eighth data source and that is in the third source configuration datastore, and the server determines, from the third source configuration datastore based on the correspondence, the configuration data that comes from the eighth data source. It should be noted that, if the third source configuration datastore includes the configuration data that comes from the eighth data source, the server can successfully perform configuration query, that is, successfully find, through query, the configuration data that comes from the eighth data source. The obtained query result includes the configuration data that comes from the eighth data source and that is in the third source configuration datastore. If the third source configuration datastore does not include the configuration data that comes from the eighth data source, the server cannot successfully perform configuration query. The obtained query result indicates that the query fails.

Step 1004: The server sends a configuration query response to the first client, where the configuration query response includes the query result.

In this embodiment of the present disclosure, when the server successfully performs configuration query, the server sends a configuration query response to the first client, and the configuration rollback response includes the query result. When the server does not successfully perform configuration query, the server sends a configuration rollback response to the first client, where the configuration rollback response indicates that the query fails.

For example, when the query result includes the configuration data that comes from the eighth data source and that is in the third source configuration datastore, the configuration query response sent by the server to the first client includes the following information: The parameter <data> includes queried configuration data and an identifier of a data source to which the configuration data belongs. In this example, the queried configuration data includes configuration data related to a Border Gateway Protocol (BGP) and configuration data related to an interior gateway protocol (including configuration data related to Open Shortest Path First (OSPF)). Configuration data in <bgp> comes from a data source XXX, and configuration data related to

```
<ospf> comes from a data source YYY.
   <rpc-reply message-id="102"
      xmlns="urn:ietf:params:xml:ns:netconf:base:1.0">
      <data>
         <bgp wds:with-data-source="XXX">
            <peer>
               <name>2001:db8::2:3</name>
               <local-port>60794</local-port>
               <state>established</state>
            </peer>
         </bgp>
         <ospf wds:with-data-source="YYY">
            ...
         </ospf>
      </data>
   </rpc-reply>
```

Step 1005: The first client receives the configuration query response sent by the server.

In this embodiment of the present disclosure, the configuration query response sent by the server includes the query result. If the query result includes the queried configuration data that comes from the eighth data source and that is in the third source configuration datastore, after receiving the configuration query response, the first client obtains the configuration data that comes from the eighth data source and that is in the third source configuration datastore. If the query result indicates that the query fails, after receiving the configuration query response, the first client learns that the query fails.

The code examples in the foregoing embodiments are all implemented based on the NETCONF protocol. In this embodiment of the present disclosure, some of the foregoing examples may alternatively be implemented by extending the RESTCONF protocol, for example, the configuration query, the configuration delivery, the configuration backup, and the configuration rollback. It should be noted that the RESTCONF protocol is based on an HTTP request and uses create, read, update, delete (CRUD) operations to manage data in a configuration datastore. The RESTCONF protocol supports the following operation methods: HEAD, GET, POST, PUT, PATCH, DELETE, and the like.

For the HEAD and GET operations, in this embodiment of the present disclosure, a query parameter is extended in the GET operation, to support configuration query of a specified data source. The HEAD operation is for returning HTTP packet header information, and the GET operation is for returning queried data. Assuming that the first client requests to query configuration data whose artist is Foo Fighters and whose specified data source is XXX, a GET request sent by the first client to the server includes the following information:

```
GET /restconf/data/example-jukebox:jukebox/\
    library/artist=Foo%20Fighters&data-source=XXX HTTP/1.1
Host: example.com
Accept: application/yang-data+xml
```

Correspondingly, the configuration query response sent by the server to the first client may include the following information:

```
HTTP/1.1 200 OK
Date: Thu, 26 Jan 2017 20:56:30 GMT
Server: example-server
Content-Type: application/yang-data+xml
Cache-Control: no-cache
ETag: "a74eefc993a2b"
Last-Modified: Thu, 26 Jan 2017 14:02:14 GMT
<album xmlns="http://example.com/ns/example-jukebox"
    xmlns:jbox="http://example.com/ns/example-jukebox">
  <name>Wasting Light</name>
  <genre>jbox:alternative</genre>
  <year>2011</year>
</album>
```

For the POST, PATCH, PUT, and DELETE operations, in this embodiment of the present disclosure, an identifier of a data source is attached to a corresponding data resource, to support configuration management of a specified data source. POST is used as an example. An identifier of a data source is attached to a data resource corresponding to a POST request, to support configuration creation or update of the data source. For example, a POST request packet sent by the first client to the server includes the following information:

```
POST /restconf/data HTTP/1.1
Host: example.com
Content-Type: application/yang-data+xml
<input xmlns-https://example.com/ns/example-ops data-source="YYY">
  <delay>-33</delay>
  <message>Going down for system maintenance</message>
  <language>en-US</language>
</input>
```

Correspondingly, the configuration update response sent by the server to the first client may include the following information:

```
HTTP/1.1 201 Created
Date: Thu, 26 Jan 2017 20:56:30 GMT
Server: example-server
Location: https://example.com/restconf/data/\
    example-ops:input
Last-Modified: Thu, 26 Jan 2017 20:56:30 GMT
ETag: "b3a3e673be2"
```

Figure 5:
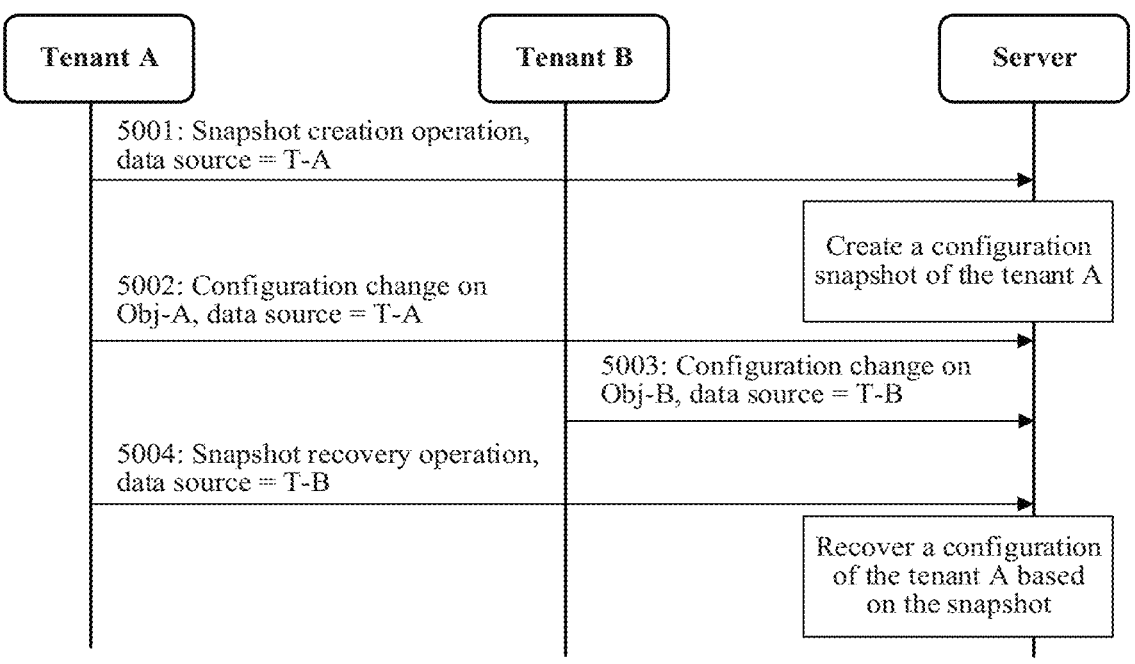
FIG. 5 is a flowchart of still another configuration management method according to an embodiment of the present disclosure.

The following describes the configuration management method provided in embodiments of the present disclosure again by using examples shown in FIG. 4 and FIG. 5.

FIG. 4 is a flowchart of another configuration management method according to an embodiment of the present disclosure. In FIG. 4, one application is used as one data source, and application-level configuration commission and rollback are used as an example for description. It is assumed that an APP 1 and an APP 2 are two applications on a client (for example, a controller), and the APP 1 and the APP 2 are connected to a server (for example, a network device) by using a same session. Configuration delivery modes of both the APP 1 and the APP 2 are as follows: Configuration data is first written into a candidate configuration datastore and then committed to a running configuration datastore through the commit operation. In addition, it is assumed that the server supports a confirmed-commit: 1.1 capability, that is, supports a commission confirmation mechanism.

Refer to FIG. 4. In step 4001 and step 4002, the APP 1 and the APP 2 respectively write their respective configuration data into a candidate configuration datastore by using an edit-config operation, and announce, in the edit-config operation by using an <data-source> parameter, that data sources are respective application IDs. In step 4003, when the configuration editing of the APP 2 is not completed, the APP 1 performs a commit operation, where the commit operation carries the ID of the APP 1 and timeout indication information, indicating that only the configuration data of the APP 1 is committed to a running configuration datastore, so that a configuration progress of the APP 2 is not affected. In step 4004, the APP 2 may continue to edit a configuration when the APP 1 has committed a configuration. After the configuration editing is ready, the configuration data edited by APP 2 is committed to the running configuration datastore by using a commit operation in step 4005, and the commit operation carries the ID of APP 2. If the APP 1 finds that the committed configuration data is incorrect, in step 4006, the APP 1 may perform a cancel-commit operation to cancel this configuration commission. In addition, the data source specified in the cancel-commit operation is the APP 1, indicating that only the configuration data committed by APP 1 to the running configuration datastore is rolled back to the candidate configuration datastore. The configuration data committed by APP 2 in step 4005 is not affected. After committing the configuration data in step 4005, the APP 2 may continue to edit configuration data in the candidate configuration datastore in step 4007, and announce that a data source is the APP 2. After the configuration commission is canceled in step 4006, the APP 1 may further continue to edit configuration data in the candidate configuration datastore in step 4008, and declare that a data source is the APP 1. If the APP 2 expects to discard configuration update that is edited in the candidate configuration datastore after step 4005 but is not committed in the running configuration datastore, the APP 2 may discard the configuration data that is not committed by the APP 2 by performing a discard-changes operation in step 4009, and declare that a data source is the APP 2, so that the configuration delivered by the APP 1 in step 4008 is not discarded.

It can be learned from FIG. 4 that, in a process of performing configuration management based on a data source, each application performs configuration management independently, and commission and rollback of configuration data of different applications do not interfere with each other.

FIG. 5 is a flowchart of still another configuration management method according to an embodiment of the present disclosure. In FIG. 5, one tenant is used as one data source, and tenant-level configuration backup and configuration recovery are used as an example for description. It is assumed that a tenant on a server includes a plurality of tenants, such as a tenant A (T-A) and a tenant B (T-B). The tenant is a resource user of the server. Service configurations of the tenants are delivered and maintained independently.

Refer to FIG. 5. The tenant A commits a snapshot creation request at a moment in step S001, and adds an ID of the tenant A to a parameter <data-source> of the snapshot creation request, indicating that a backup (that is, a snapshot) is created only for configuration data of the tenant A. The created backup configuration data includes the configuration data of the tenant A, that is, the snapshot is independently created based on the tenant A. Then, both the tenant A and the tenant B may perform a configuration update operation, and declare that data sources of configuration update are their respective tenant IDs. Assuming that in step S002, the tenant A modifies configuration data of a configuration object A (Obj-A), a data source of the configuration data related to ObjectA on the server is marked as T-A. Assuming that in step S003, the tenant B modifies configuration data of a configuration object B (Obj-B), a data source of the configuration data related to ObjectB on the server is marked as T-B. If the configuration data related to the tenant A needs to be recovered in a running process to configuration data at a time point corresponding to step S001, for example, a configuration delivered by the tenant A in step S002 is incorrect, or a test configuration delivered in step S002 needs to be canceled, in step S004, the tenant A may perform a recover-snapshot operation to recover the configuration data of the tenant A based on the snapshot, and add the ID of the tenant A to a parameter <data-source> of the recover-snapshot operation. In this way, the configuration data of the tenant B is not affected.

It can be learned from FIG. 5 that, in a multi-tenant scenario, each tenant independently performs service configuration delivery and operation and maintenance. Based on tenant-level configuration management, when a service of a tenant changes incorrectly, configuration data of the tenant can be recovered to configuration data backed up at a previous moment.

It should be noted that, when refined configuration management is performed based on data sources, configuration conflicts and dependencies between data sources may affect configuration commission, rollback, snapshot recovery, and the like to some extent. Therefore, configurations of data sources should be decoupled as much as possible, and dependencies between data sources of a same level should be reduced as much as possible. If a configuration dependency exists between data sources of a same level due to an actual reason, the configuration management personnel should be clear about a configuration dependency in a configuration management operation to be performed. After the configuration dependency is resolved, the configuration management personnel may perform the configuration management operation (such as configuration delivery, rollback, and recovery).

In conclusion, in the configuration management in this embodiment of the present disclosure, a configuration commission request sent by a client to a server includes an identifier of a specified data source. In this way, even if configuration data in a candidate configuration datastore comes from a plurality of data sources, the server does not commit all configuration data that comes from data sources other than the specified data source in the plurality of data sources to a running configuration datastore. In other words, in this solution, some configuration data that is not expected to be committed is not forced to be committed when configuration data from a data source needs to be committed. Similarly, during configuration rollback, configuration management progresses of all data sources do not need to be the same. Configuration rollback may be performed based on a single data source. In addition, configuration data of the data sources is backed up and recovered independently. Configuration recovery of a data source does not affect another data source. It can be learned that, in this solution, configuration management is performed by specifying a data source, thereby reducing mutual impact of configuration management between different data sources. This solution is more flexible and reliable.

Figure 6:
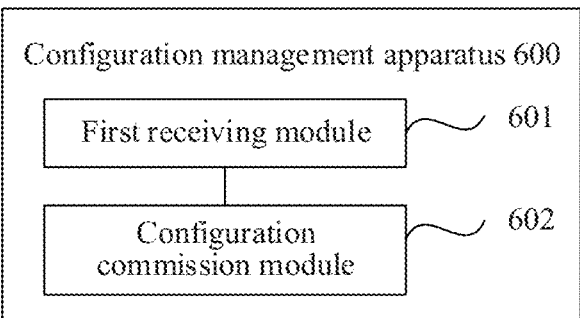
FIG. 6 is a diagram of a structure of a configuration management apparatus according to an embodiment of the present disclosure.

FIG. 6 is a diagram of a structure of a configuration management apparatus 600 according to an embodiment of the present disclosure. The configuration management apparatus 600 may be implemented as a part or all of a communication device by using software, hardware, or a combination thereof. The communication device may be any server in the foregoing embodiments. In this embodiment of the present disclosure, the apparatus 600 is used in the server. Refer to FIG. 6. The apparatus 600 includes a first receiving module 601 and a configuration commission module 602.

The first receiving module 601 is configured to receive a NETCONF configuration commission request sent by a first client, where the NETCONF configuration commission request includes an identifier of a first data source.

The configuration commission module 602 is configured to commit, based on the identifier of the first data source, configuration data that comes from the first data source and that is in a candidate configuration datastore to a running configuration datastore, where configuration data in the candidate configuration datastore comes from at least one data source, and the at least one data source includes the first data source.

Optionally, the apparatus 600 further includes: a second receiving module configured to receive a NETCONF configuration update request sent by the first client, where the NETCONF configuration update request includes an identifier of a second data source and first configuration data; and a configuration update module configured to: update the first configuration data to a first target configuration datastore based on the identifier of the second data source, and record a correspondence between the first data source and the first configuration data in the first target configuration datastore.

Optionally, the apparatus 600 further includes: a third receiving module configured to receive a NETCONF configuration update cancellation request sent by the first client, where the NETCONF configuration update cancellation request includes an identifier of a third data source; and an update cancellation module configured to roll back, based on the identifier of the third data source, configuration data that comes from the third data source and that is in the candidate configuration datastore to be consistent with configuration data that comes from the third data source and that is in the running configuration datastore.

Optionally, the apparatus 600 further includes: a fourth receiving module configured to receive a NETCONF commission cancellation request sent by the first client, where the NETCONF commission cancellation request includes an identifier of a fourth data source; and a commission cancellation module configured to cancel, based on the identifier of the fourth data source, a commit operation on configuration data that comes from the fourth data source and that is in the running configuration datastore.

Optionally, the apparatus 600 further includes: a fifth receiving module configured to receive a NETCONF configuration copying request sent by the first client, where the NETCONF configuration copying request includes an identifier of a first source configuration datastore, an identifier of a fifth data source, and an identifier of a first target storage object; and a configuration copying module configured to copy, based on the identifier of the first source configuration datastore, the identifier of the fifth data source, and the identifier of the first target storage object, configuration data that comes from the fifth data source and that is in the first source configuration datastore to the first target storage object.

Optionally, the first target storage object includes a second target configuration datastore or a first target file.

Optionally, the apparatus 600 further includes: a sixth receiving module configured to receive a NETCONF backup creation request sent by the first client, where the NETCONF backup creation request includes an identifier of a sixth data source; and a configuration backup module configured to back up, based on the identifier of the sixth data source, configuration data that comes from the sixth data source and that is in a second source configuration datastore, to generate one piece of backup configuration data.

Optionally, the server stores one or more pieces of backup configuration data, and the apparatus 600 further includes: a seventh receiving module configured to receive a NETCONF configuration rollback request sent by the first client, where the NETCONF configuration rollback request includes an identifier of first backup configuration data and an identifier of a seventh data source, and the first backup configuration data is one of the one or more pieces of backup configuration data; and a configuration rollback module configured to roll back, based on the identifier of the first backup configuration data and the identifier of the seventh data source, configuration data that comes from the seventh data source and that is in a third target configuration datastore to be consistent with the first backup configuration data.

Optionally, the apparatus 600 further includes: an eighth receiving module configured to receive a NETCONF configuration query request sent by the first client, where the NETCONF configuration query request includes an identifier of an eighth data source; a configuration query module configured to query, based on the identifier of the eighth data source, a third source configuration datastore for configuration data that comes from the eighth data source, to obtain a query result; and a query response module configured to send a configuration query response to the first client, where the configuration query response includes the query result.

Optionally, the first data source includes one or more of the following: a first tenant, a first service, a first session, the first client, and a first administrator.

The first tenant is any tenant leasing the server, the first service is any service on the first client, the first session is a session established between the first client and the server, the first client is any client that performs configuration management on the server, and the first administrator is any user using the first client.

In this embodiment of the present disclosure, in a configuration management process, a configuration commission request sent by a client to a server includes an identifier of a specified data source. In this way, even if configuration data in a candidate configuration datastore comes from a plurality of data sources, the server does not commit all configuration data that comes from data sources other than the specified data source in the plurality of data sources to a running configuration datastore. In other words, in this solution, some configuration data that is not expected to be committed is not forced to be committed when configuration data from a data source needs to be committed. It can be learned that, in this solution, configuration management is performed by specifying a data source, thereby reducing mutual impact of configuration management between different data sources. This solution is more flexible and reliable.

It should be noted that: When the configuration management apparatus provided in the foregoing embodiment performs configuration management, division into the foregoing functional modules is merely described by using an example. In actual application, the foregoing functions may be allocated to different functional modules for implementation according to a requirement. In other words, an internal structure of the apparatus is divided into different functional modules, to implement all or some of the functions described above. In addition, the configuration management apparatus provided in the foregoing embodiment and the configuration management method embodiments belong to a same concept. For a specific implementation process of the configuration management apparatus, refer to the method embodiments.

Figure 7:
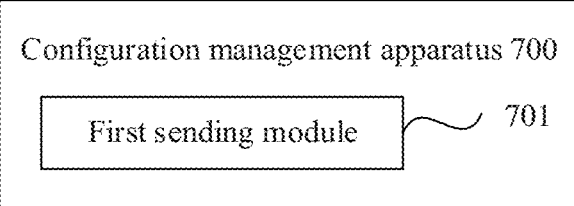
FIG. 7 is a diagram of a structure of another configuration management apparatus according to an embodiment of the present disclosure.

FIG. 7 is a diagram of a structure of a configuration management apparatus 700 according to an embodiment of the present disclosure. The configuration management apparatus 700 may be implemented as a part or all of a communication device by using software, hardware, or a combination thereof. The communication device may be any client in the foregoing embodiments. In this embodiment of the present disclosure, the apparatus is used for a first client. Refer to FIG. 7. The apparatus 700 includes a first sending module 701.

The first sending module 701 is configured to send a NETCONF configuration commission request to a server, where the NETCONF configuration commission request includes an identifier of a first data source.

The NETCONF configuration commission request indicates the server to commit, based on the identifier of the first data source, configuration data that comes from the first data source and that is in a candidate configuration datastore to a running configuration datastore, where configuration data in the candidate configuration datastore comes from at least one data source, and the at least one data source includes the first data source.

Optionally, the apparatus 700 further includes: a second sending module configured to send a NETCONF configuration update request to the server, where the NETCONF configuration update request includes an identifier of a second data source and first configuration data.

The NETCONF configuration update request indicates the server to update the first configuration data to a first target configuration datastore based on the identifier of the second data source, and record a correspondence between the first data source and the first configuration data in the first target configuration datastore.

Optionally, the apparatus 700 further includes: a third sending module configured to send a NETCONF configuration update cancellation request to the server, where the NETCONF configuration update cancellation request includes an identifier of a third data source.

The NETCONF configuration update cancellation request indicates the server to roll back, based on the identifier of the third data source, configuration data that comes from the third data source and that is in the candidate configuration datastore to be consistent with configuration data that comes from the third data source and that is in the running configuration datastore.

Optionally, the apparatus 700 further includes: a fourth sending module configured to send a NETCONF commission cancellation request to the server, where the NETCONF commission cancellation request includes an identifier of a fourth data source.

The NETCONF commission cancellation request indicates the server to cancel, based on the identifier of the fourth data source, a commit operation on configuration data that comes from the fourth data source and that is in the running configuration datastore.

Optionally, the apparatus 700 further includes: a fifth sending module configured to send a NETCONF configuration copying request to the server, where the NETCONF configuration copying request includes an identifier of a first source configuration datastore, an identifier of a fifth data source, and an identifier of a first target storage object.

The NETCONF configuration copying request indicates the server to copy, based on the identifier of the first source configuration datastore, the identifier of the fifth data source, and the identifier of the first target storage object, configuration data that comes from the fifth data source and that is in the first source configuration datastore to the first target storage object.

Optionally, the first target storage object includes a second target configuration datastore or a first target file.

Optionally, the apparatus 700 further includes: a sixth sending module configured to send a NETCONF backup creation request to the server, where the NETCONF backup creation request includes an identifier of a sixth data source.

The NETCONF backup creation request indicates the server to back up, based on the identifier of the sixth data source, configuration data that comes from the sixth data source and that is in a second source configuration datastore, to generate one piece of backup configuration data.

Optionally, the server stores one or more pieces of backup configuration data, and the apparatus 700 further includes: a seventh sending module configured to send a NETCONF configuration rollback request to the server, where the NETCONF configuration rollback request includes an identifier of first backup configuration data and an identifier of a seventh data source, and the first backup configuration data is one of the one or more pieces of backup configuration data.

The NETCONF configuration rollback request indicates the server to roll back, based on the identifier of the first backup configuration data and the identifier of the seventh data source, configuration data that comes from the seventh data source and that is in a third target configuration datastore to be consistent with the first backup configuration data.

Optionally, the apparatus 700 further includes: an eighth sending module configured to send a NETCONF configuration query request to the server, where the NETCONF configuration query request includes an identifier of an eighth data source; and a receiving module configured to receive a configuration query response sent by the server, where the configuration query response includes a query result, and the query result is obtained by the server by querying, based on the identifier of the eighth data source, a third source configuration datastore for configuration data that comes from the eighth data source.

Optionally, the first data source includes one or more of the following: a first tenant, a first service, a first session, the first client, and a first administrator.

The first tenant is any tenant leasing the server, the first service is any service on the first client, the first session is a session established between the first client and the server, the first client is any client that performs configuration management on the server, and the first administrator is any user using the first client.

In this embodiment of the present disclosure, in a configuration management process, a configuration commission request sent by a client to a server includes an identifier of a specified data source. In this way, even if configuration data in a candidate configuration datastore comes from a plurality of data sources, the server does not commit all configuration data that comes from data sources other than the specified data source in the plurality of data sources to a running configuration datastore. In other words, in this solution, some configuration data that is not expected to be committed is not forced to be committed when configuration data from a data source needs to be committed. It can be learned that, in this solution, configuration management is performed by specifying a data source, thereby reducing mutual impact of configuration management between different data sources. This solution is more flexible and reliable.

It should be noted that: When the configuration management apparatus provided in the foregoing embodiment performs configuration management, division into the foregoing functional modules is merely described by using an example. In actual application, the foregoing functions may be allocated to different functional modules for implementation according to a requirement. In other words, an internal structure of the apparatus is divided into different functional modules, to implement all or some of the functions described above. In addition, the configuration management apparatus provided in the foregoing embodiment and the configuration management method embodiments belong to a same concept. For a specific implementation process of the configuration management apparatus, refer to the method embodiments.

All or some of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to embodiments of the present disclosure are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, a computer, a server or a data center to another website, computer, server or data center in a wired (for example, a coaxial cable, an optical fiber, a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like. It should be noted that the computer-readable storage medium mentioned in embodiments of the present disclosure may be a non-volatile storage medium, that is, may be a non-transitory storage medium.

It should be understood that "at least one" mentioned in this specification refers to one or more, and "a plurality of" refers to two or more. In the descriptions of embodiments of the present disclosure, "/" means "or" unless otherwise specified. For example, A/B may represent A or B. In this specification, "and/or" describes only an association relationship between associated objects and represents that three relationships may exist. For example, A and/or B may represent the following three cases. Only A exists, both A and B exist, and only B exists. In addition, to clearly describe the technical solutions in embodiments of the present disclosure, terms such as first and second are used in embodiments of the present disclosure to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It should be noted that information (including but not limited to user equipment information, personal information of a user, and the like), data (including but not limited to data used for analysis, stored data, displayed data, and the like), and signals in embodiments of the present disclosure are used under authorization by the user or full authorization by all parties, and capturing, use, and processing of related data need to confirm to related laws, regulations, and standards of related countries and regions. For example, the network configuration protocol NETCONF configuration commission request in embodiments of the present disclosure is obtained when full authorization is performed.

The foregoing descriptions are merely example embodiments of the present disclosure, and are not intended to limit the present disclosure. Any modification, equivalent replacement, or improvement made without departing from the spirit and principle of the present disclosure should fall within the protection scope of this application.

What is claimed is:

1. A method comprising:
receiving, from a first client, a Network Configuration Protocol (NETCONF) configuration commission request comprising a first identifier of a first data source;
committing, to a running configuration datastore based on the first identifier, first configuration data that is from the first data source and that is in a candidate configuration datastore, wherein the candidate configuration datastore comprises a plurality of configuration data from a plurality of data sources, and wherein the plurality of data sources comprises the first data source;
receiving, from the first client, a NETCONF configuration update cancellation request comprising a second identifier of a second data source; and rolling back, based on the second identifier, second configuration data that is from the second data source and that is in the candidate configuration datastore to be consistent with third configuration data that is from the second data source and that is in the running configuration datastore.

2. The method of claim 1, further comprising:
receiving, from the first client, a NETCONF configuration update request comprising a third identifier of a third data source and comprising third configuration data;
updating, in a target configuration datastore, the third configuration data based on the third identifier; and
recording, in the target configuration datastore, a correspondence between the first data source and the third configuration data.

3. The method of claim 1, further comprising:
receiving, from the first client, a NETCONF commission cancellation request comprising a third identifier of a third data source; and
canceling, based on the third identifier, a commit operation on third configuration data that is from the third data source and that is in the running configuration datastore.

4. The method of claim 1, further comprising:
receiving, from the first client, a NETCONF configuration copying request comprising a third identifier of a source configuration datastore, a fourth identifier of a third data source, and a fifth identifier of a target storage object; and
copying, to the target storage object based on the third identifier, the fourth identifier, and the fifth identifier, third configuration data that is from the third data source and that is in the source configuration datastore.

5. The method of claim 4, wherein the target storage object comprises a target configuration datastore or a target file.

6. The method of claim 1, further comprising:
receiving, from the first client, a NETCONF backup creation request comprising a third identifier of a third data source; and
backing up, based on the third identifier, third configuration data that is from the third data source and that is in a source configuration datastore to generate backup configuration data.

7. An apparatus comprising:
a memory configured to store instructions; and
one or more processors coupled to the memory and configured to execute the instructions to cause the apparatus to:
receive, from a first client, a Network Configuration Protocol (NETCONF) configuration commission request comprising a first identifier of a first data source;
commit, to a running configuration datastore based on the first identifier, first configuration data that is from the first data source and that is in a candidate configuration datastore, wherein the candidate configuration datastore comprises a plurality of configuration data from a plurality of data sources, and wherein the plurality of data sources comprises the first data source;
receive, from the first client, a NETCONF configuration update cancellation request comprising a second identifier of a second data source; and
roll back, based on the second identifier, second configuration data that is from the second data source and that is in the candidate configuration datastore to be consistent with third configuration data that is from the second data source and that is in the running configuration datastore.

8. The apparatus of claim 7, wherein the one or more processors are further configured to execute the instructions to cause the apparatus to:

receive, from the first client, a NETCONF configuration update request comprising a third identifier of a third data source and comprising third configuration data;

update, in a target configuration datastore, the third configuration data based on the third identifier; and record, in the target configuration datastore, a correspondence between the first data source and the third configuration data.

9. The apparatus of claim 7, wherein the one or more processors are further configured to execute the instructions to cause the apparatus to:

receive, from the first client, a NETCONF commission cancellation request comprising a third identifier of a third data source; and cancel, based on the third identifier, a commit operation on third configuration data that is from the third data source and that is in the running configuration datastore.

10. The apparatus of claim 7, wherein the one or more processors are further configured to execute the instructions to cause the apparatus to:

receive, from the first client, a NETCONF configuration copying request comprising a third identifier of a source configuration datastore, a fourth identifier of a third data source, and a fifth identifier of a target storage object; and copy, to the target storage object based on the third identifier, the fourth identifier, and the fifth identifier, third configuration data that is from the third data source and that is in the source configuration datastore.

11. The apparatus of claim 10, wherein the target storage object comprises a target configuration datastore or a target file.

12. An apparatus comprising:

a memory configured to store instructions; and one or more processors coupled to the memory and configured to execute the instructions to cause the apparatus to:

send, to a server, a network configuration protocol (NETCONF) configuration commission request comprising a first identifier of a first data source, wherein the NETCONF configuration commission request indicates to the server to commit, based on the first identifier, first configuration data that is from the first data source and that is in a candidate configuration datastore to a running configuration datastore, wherein the candidate configuration datastore comprises a plurality of configuration data from a plurality of data sources, and wherein the plurality of data sources comprises the first data source; and send, to the server, a NETCONF configuration update cancellation request comprising a second identifier of a second data source, wherein the NETCONF configuration update cancellation request indicates to the server to roll back, based on the second identifier, second configuration data that is from the second data source and that is in the candidate configuration datastore to be consistent with third configuration data that is from the second data source and that is in the running configuration datastore.

13. The apparatus of claim 12, wherein the one or more processors are further configured to execute the instructions to cause the apparatus to send, to the server, a NETCONF configuration update request comprising a third identifier of a third data source and comprising third configuration data; and wherein the NETCONF configuration update request indicates to the server to update the third configuration data in a first target configuration datastore based on the third identifier, and to record, in the first target configuration datastore, a correspondence between the first data source and the third configuration data.

14. The apparatus of claim 12, wherein the one or more processors are further configured to execute the instructions to cause the apparatus to send, to the server, a NETCONF commission cancellation request comprising a third identifier of a third data source, wherein the NETCONF commission cancellation request indicates to the server to cancel, based on the third identifier, a commit operation on third configuration data that is from the third data source and that is in the running configuration datastore.

15. The apparatus of claim 12, wherein the one or more processors are further configured to execute the instructions to cause the apparatus to send, to the server, a NETCONF configuration copying request comprising a third identifier of a source configuration datastore, a fourth identifier of a third data source, and a fifth identifier of a target storage object, wherein the NETCONF configuration copying request indicates to the server to copy, to the target storage object based on the third identifier, the fourth identifier, and the fifth identifier, third configuration data that is from the third data source and that is in the source configuration datastore.

16. The apparatus of claim 15, wherein the target storage object comprises a target configuration datastore or a target file.

17. The apparatus of claim 12, wherein the one or more processors are further configured to execute the instructions to cause the apparatus to send, to the server, a NETCONF backup creation request comprising a third identifier of a third data source, wherein the NETCONF backup creation request indicates to the server to back up, based on the third identifier, third configuration data that is from the third data source and that is in a source configuration datastore to generate backup configuration data.

* * * * *